United States Patent
Gjerdingen et al.

(10) Patent No.: US 6,539,395 B1
(45) Date of Patent: Mar. 25, 2003

(54) METHOD FOR CREATING A DATABASE FOR COMPARING MUSIC

(75) Inventors: Robert O. Gjerdingen, Wilmette, IL (US); Rehan M. Khan, Palo Alto, CA (US); Marc Mathys, Aspen, CO (US); Christian D. Pirkner, Hillsborough, CA (US); Pete W. Rice, San Francisco, CA (US); Thomas R. Sulzer, Hillsborough, CA (US)

(73) Assignee: Mood Logic, Inc., San Francisco, CA (US)

(*) Notice: Subject to any disclaimer, the term of this patent is extended or adjusted under 35 U.S.C. 154(b) by 0 days.

(21) Appl. No.: 09/533,045

(22) Filed: Mar. 22, 2000

(51) Int. Cl.$^7$ ............................................. G06F 17/30
(52) U.S. Cl. ......................................... 707/102; 707/6
(58) Field of Search ..................................... 707/6, 102

(56) References Cited

U.S. PATENT DOCUMENTS

| | | | | |
|---|---|---|---|---|
| 5,521,324 A | * | 5/1996 | Dannenberg et al. | 84/612 |
| 5,616,876 A | | 4/1997 | Cluts | 84/609 |
| 5,647,058 A | * | 7/1997 | Agrawal et al. | 707/1 |
| 5,696,964 A | * | 12/1997 | Cox et al. | 707/104.1 |
| 6,201,176 B1 | * | 3/2001 | Yourlo | 434/307 A |
| 6,289,354 B1 | * | 9/2001 | Aggarwal et al. | 707/104.1 |

OTHER PUBLICATIONS

"Elements of Information Theory" by T.M. Cover and A.T. Joy (1991), published by John Wiley & Songs Inc., New York; p. 18.

"Multivariate Analysis, Methods and Applications" by William R. Dillon & Matthew Goldstein (1984), published by John Wiley & Sons; New York; Chapters 2 (pp 23–52) 3 (pp 53–106), 4 (pp107–156) 5 (pp157–208).

"Multivariate Observations" by G.A.F. Seber, (1984), published by John Wiley & Sons; New York; pp. 253–278.

"Generalized Linear Models" by McCullagh & Nelder (1983), published by Chapman And Hall $2^{nd}$ Edition; New York; Chapters 5 (pp 149–191), 6 (pp 193–244).

"General Additive Models" by Hastie & Tibshirani, (1990) published by Chapman And Hall; London; Chapters 4 (pp 83–104), 6 (pp136–173).

"An Introduction to Bayesian Statistical Decision Process" by Bruce W. Morgan (1968), published by Prentice–Hall, Inc.; Englewood Cliffs, New Jersey; Chapter 6 (pp 91–108).

"Learning Bayesian Networks: The Combination of Knowledge and Statistical Data" by D. Heckerman, D. Geiger, D.M. Chickering (1994), Microsoft Research Technical Report, published by Prentice–Hall, Inc. (pp 1–53).

(List continued on next page.)

*Primary Examiner*—Wayne Amsbury
(74) *Attorney, Agent, or Firm*—Mood Logic, Inc.; Marc Mathys, Esq.

(57) ABSTRACT

A method for creating a database that allows content based searching in the music domain is provided. The process provides music samples to music listeners, wherein the music listeners include a plurality of average music listeners and a plurality of expert music listeners. The process further provides a plurality of questions to the average music listeners and the expert music listeners; wherein the plurality of questions require a listener response and every listener response assigns a value to a feature vector, wherein the feature vector defines a music attribute. The process then compares the plurality of music samples, wherein comparing the feature vectors compares the music sample. Thereafter, the process stores the compared data.

20 Claims, 22 Drawing Sheets

OTHER PUBLICATIONS

"Elements of Statistical Computing: Numerical computation" by R.A. Thisted (1988), published by Chapman & Hall; New York, Chapters 4 (pp155–258), 6 (pp 337–361).

"Bayesian Data Analysis" by Gelman J. Carlin, H.S. Stern, D.B. Rubin (1995), published by CRC Press; New York; Chapters 5 (pp 119–160), 13 (pp 366–383), 14 (384–406), 15 (407–419), 16 (pp–420–438).

"Neural Networks: Networks a Comprehensive Foundation", by Haykin, S. (1994); MacMillan College Publication Co.; New York; Chapter 6 (pp138–235).

"Classification and Regression Trees", by Brieman, J.H. Friedman, R.A. Olshen & C.J. Stone (1984), published by Wadsworth, Belmont California; Chapters 1 (pp 1–17), 2 (pp 18–58), 8 (pp 216–265) , 9 (pp 266–278) 11 (pp 297–312).

"An Introduction to Fuzzy Logic Applications in Intelligent Systems" by R.R. Yager & Lofti A. Zadeh (1992), published by Kluwer Academic Publishers: Norwell, MA; Chapters 1 (pp 1–25), 10 (pp 221–233).

"Tempo and beat analysis of acoustic music signals" by Eric D. Scheirer, Machine Group Listing, E–15–401D MIT Media Laboratory, Cambridge, Massachusetts (Dec. 1996); Journal of the Acoustical Society of America, vol. 103(1); pp. 588–601.

* cited by examiner

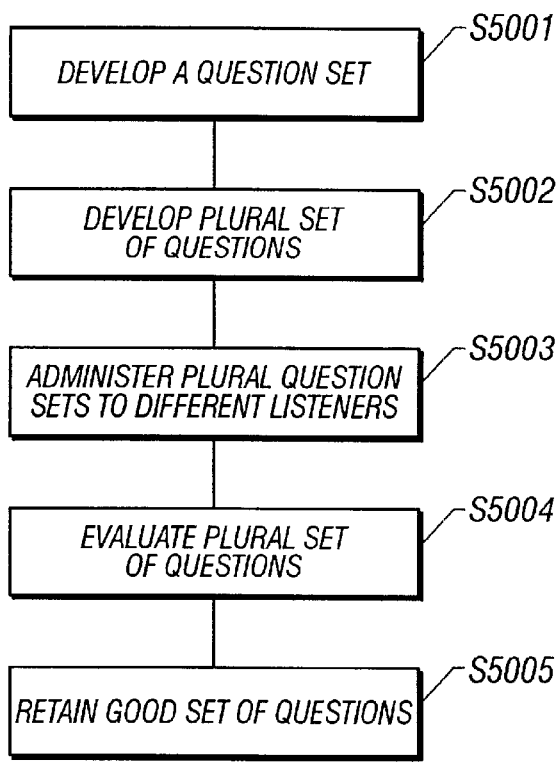
*FIG. 5B*
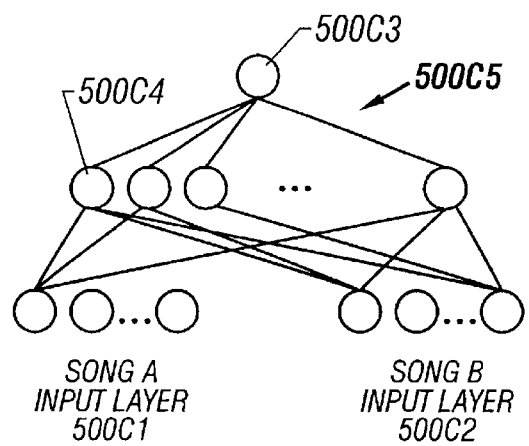
*FIG. 5C1*
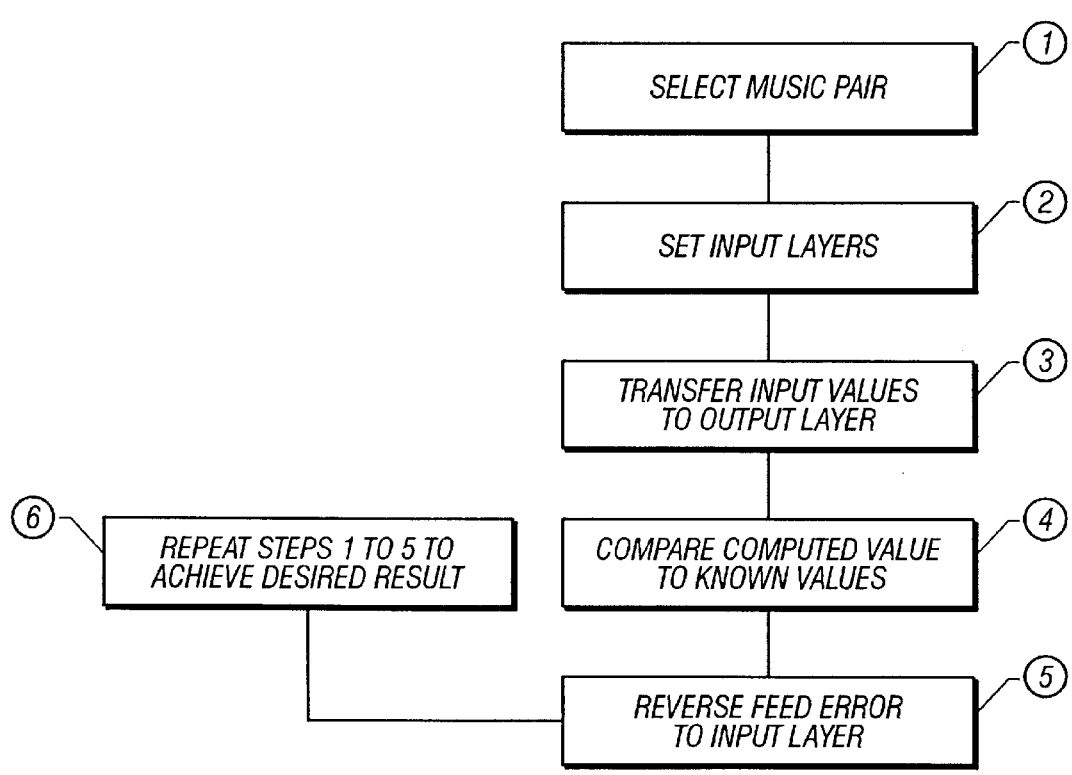
*FIG. 5C2*

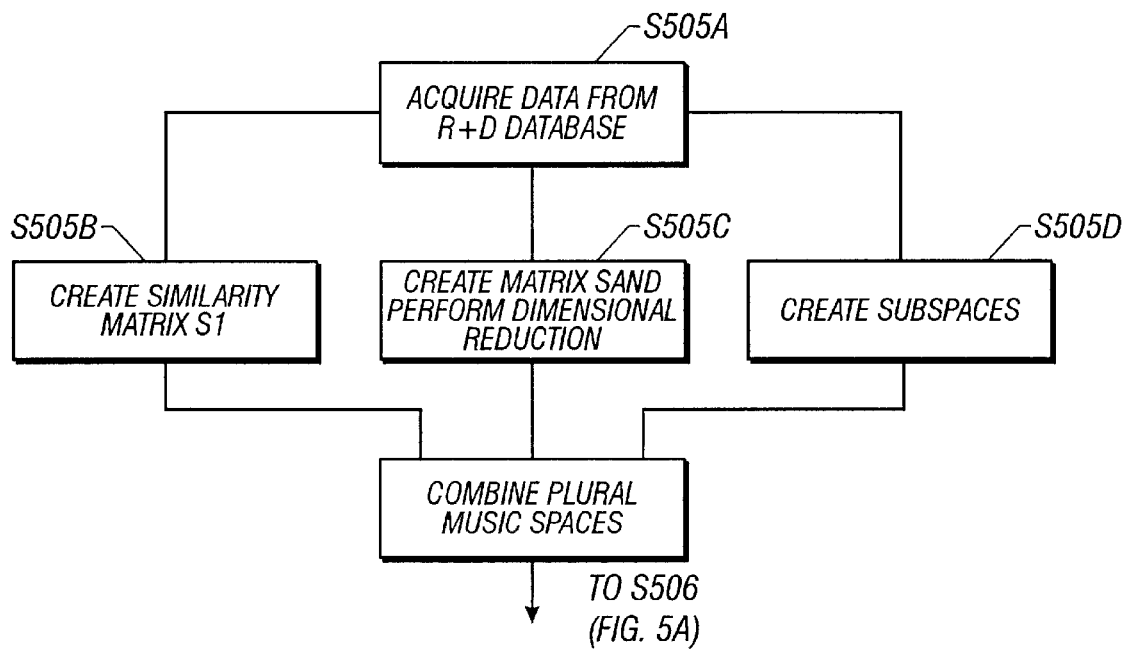
FIG. 5C3
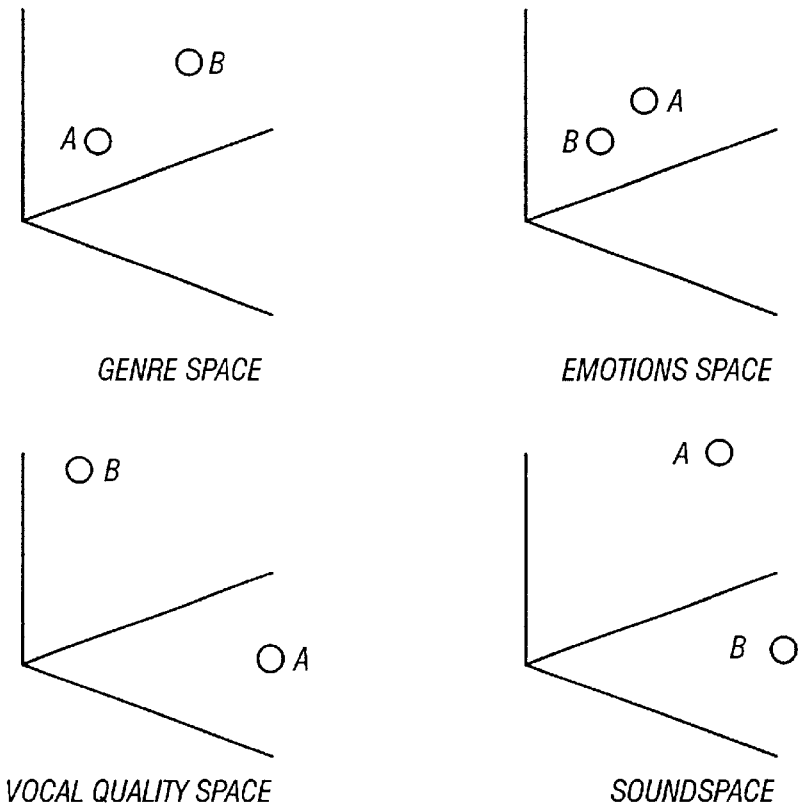
FIG. 5D

| MUSIC SAMPLE I 500AA | LISTENER RESPONSES 500BB | HISTORICAL RESPONSE 500CC | HISTORICAL STANDARD DEVIATION 500DD | HISTORICAL MEDIAN 500EE | LISTENER TIME SPENT 500FF | HISTORICAL TIME SPENT 500GG | HISTORICAL RESPONSE MEAN 500HH |
|---|---|---|---|---|---|---|---|
| QUESTIONS | | | | | | | |
| 1 | $R_1$ | $R_1 h_1$ | $\sigma_{1H}$ | $R_{1Hmed}$ | $T_1$ | $T_{1H}$ | $R_{1Hm}$ |
| 2 | $R_2$ | $R_2 h_2$ | $\sigma_{2H}$ | ............ | $T_2$ | ............ | ............ |
| ... | ............ | ............ | ............ | | ............ | | |
| n | $R_n$ | $R_n h_n$ | $\sigma_{nH}$ | $R_{nHmed}$ | $T_n$ | $T_{nH}$ | $R_{nHm}$ |

HISTORICAL STANDARD DEVIATION FOR SAMPLE $I = \dfrac{\sigma_{1H} + \sigma_{2H} \cdots \sigma_{nH}}{N}$ LISTENER STANDARD DEVIATION FOR SAMPLE $I = \sqrt{\sum\limits_{L=1}^{n}(R_L - M_L)^2}$ LISTENER MEAN RESPONSE $(M_L) = \dfrac{R_1 + R_2 \cdots R_n}{n}$

*FIG. 5F*

| SAMPLE I | 500AA | 500BB |
|---|---|---|
| | QUESTION | LISTENER RESPONSE |
| | 1 | Rs1 |
| | ⋮ | ⋮ |
| | n | Rsn |

| SAMPLE II | 500AA | 500BB |
|---|---|---|
| | QUESTION | LISTENER RESPONSE |
| | 1 | Rs1´ |
| | ⋮ | ⋮ |
| | n | Rsn´ |

*INDICATES REQUIRED FIELDS

FIRST NAME: ☐
MI: ☐
LAST NAME: ☐
E-MAIL*: ☐
ZIP*: ☐
CITY*: ☐
COUNTRY*: <SELECT> ▼
SEX*: <SELECT> ▼
YEAR OF BIRTH*: ☐ (E.G. 1977)
CONNECTION*: <SELECT> ▼

NEXT

*FIG. 6*

PLAY THE SONG

PLEASE FILL OUT EVERY QUESTION MARKED WITH THIS COLOR

|  | STRONGLY DISAGREE |  |  | NEUTRAL |  |  | STRONGLY AGREE |
|---|---|---|---|---|---|---|---|
| THIS SONG IS SIMILAR TO THE PREVIOUS SONG | O | O | O | O | O | O | O |
| I LIKE THIS SONG | O | O | O | O | O | O | O |
| THIS TUNE STICKS IN MY MIND | O | O | O | O | O | O | O |
| THIS SONG IS SIMPLE | O | O | O | O | O | O | O |
| THIS SONG TELLS A STORY | O | O | O | O | O | O | O |
| THIS SONG EMPHASIZES THE MELODY | O | O | O | O | O | O | O |
| THIS SONG EMPHASIZES THE VOCALS | O | O | O | O | O | O | O |
| THIS SONG IS SPEECH-LIKE | O | O | O | O | O | O | O |
| THIS SONG HAS A STRONG BEAT | O | O | O | O | O | O | O |
| THIS SONG HAS A GOOD GROOVE | O | O | O | O | O | O | O |
| THIS SONG IS FAST | O | O | O | O | O | O | O |
| THIS SONG IS INTENSE | O | O | O | O | O | O | O |
| THIS SONG IS UPBEAT | O | O | O | O | O | O | O |
| THIS SONG SOUNDS AGGRESSIVE | O | O | O | O | O | O | O |
| THIS SONG IS RELAXING | O | O | O | O | O | O | O |
| THIS SONG IS MELLOW | O | O | O | O | O | O | O |

700A — rows 1 through "THIS SONG IS FAST"
700B — rows "THIS SONG IS INTENSE" through "THIS SONG IS MELLOW"

*FIG. 7A1*

| | | | | | | | |
|---|---|---|---|---|---|---|---|
| 700B | THIS SONG IS SAD | ○ | ○ | ○ | ○ | ○ | ○ | ○ |
| | THIS SONG IS ROMANTIC | ○ | ○ | ○ | ○ | ○ | ○ | ○ |
| | THIS SONG EXPRESSES A BROKEN HEART | ○ | ○ | ○ | ○ | ○ | ○ | ○ |
| 700C | THE SINGER HAS A SMOOTH VOICE | ○ | ○ | ○ | ○ | ○ | ○ | ○ |
| | THE SINGER HAS A SOULFUL VOICE | ○ | ○ | ○ | ○ | ○ | ○ | ○ |
| | THE SINGER HAS HIGH VOICE | ○ | ○ | ○ | ○ | ○ | ○ | ○ |
| | THE SINGER HAS A SEXY VOICE | ○ | ○ | ○ | ○ | ○ | ○ | ○ |
| | THE SINGER HAS A POWERFUL VOICE | ○ | ○ | ○ | ○ | ○ | ○ | ○ |
| | THE SINGER HAS A TRULY GREAT VOICE | ○ | ○ | ○ | ○ | ○ | ○ | ○ |
| 700D | THIS SONG WOULD BE GOOD FOR EASY LISTENING | ○ | ○ | ○ | ○ | ○ | ○ | ○ |
| | THIS SONG WOULD BE GOOD FOR A WILD DANCE PARTY | ○ | ○ | ○ | ○ | ○ | ○ | ○ |
| | THIS SONG WOULD BE GOOD FOR SLOW DANCING | ○ | ○ | ○ | ○ | ○ | ○ | ○ |
| | THIS SONG WOULD BE GOOD FOR A WORKOUT | ○ | ○ | ○ | ○ | ○ | ○ | ○ |
| | THIS SONG WOULD BE GOOD IN A SHOPPING MALL | ○ | ○ | ○ | ○ | ○ | ○ | ○ |
| 700E | I KNOW THIS SONG | ○ | ○ | ○ | ○ | ○ | ○ | ○ |
| | I HAVE A RECORDING OF THIS SONG (YES NO) | ○ | ○ | ○ | ○ | ○ | ○ | ○ |

*FIG. 7A2*

PLAY THE SONG

INDICATE ON A SCALE FROM 0 THROUGH 6 HOW MUCH EACH OF THESE MAIN STYLES ARE REPRESENTED IN THIS SONG.

|  | 0 | 1 | 2 | 3 | 4 | 5 | 6 |
|---|---|---|---|---|---|---|---|
| ALTERNATIVE | ⦿ | ○ | ○ | ○ | ○ | ○ | ○ |
| BLUES | ⦿ | ○ | ○ | ○ | ○ | ○ | ○ |
| COUNTRY | ⦿ | ○ | ○ | ○ | ○ | ○ | ○ |
| ELECTRONIC/DANCE | ⦿ | ○ | ○ | ○ | ○ | ○ | ○ |
| FOLK | ⦿ | ○ | ○ | ○ | ○ | ○ | ○ |
| GOSPEL | ⦿ | ○ | ○ | ○ | ○ | ○ | ○ |
| JAZZ | ⦿ | ○ | ○ | ○ | ○ | ○ | ○ |
| LATIN | ⦿ | ○ | ○ | ○ | ○ | ○ | ○ |
| NEW AGE | ⦿ | ○ | ○ | ○ | ○ | ○ | ○ |
| R&B/SOUL | ⦿ | ○ | ○ | ○ | ○ | ○ | ○ |
| RAP/HIP-HOP | ⦿ | ○ | ○ | ○ | ○ | ○ | ○ |
| REGGAE | ⦿ | ○ | ○ | ○ | ○ | ○ | ○ |
| ROCK | ⦿ | ○ | ○ | ○ | ○ | ○ | ○ |

801

INDICATE ON A SCALE FROM 0 THROUGH 6 HOW MUCH EACH OF THESE SUB STYLES ARE REPRESENTED IN THIS SONG.

|  | 0 | 1 | 2 | 3 | 4 | 5 | 6 |
|---|---|---|---|---|---|---|---|
| BLUES | ⦿ | ○ | ○ | ○ | ○ | ○ | ○ |
| GOSPEL | ⦿ | ○ | ○ | ○ | ○ | ○ | ○ |
| MOTOWN | ⦿ | ○ | ○ | ○ | ○ | ○ | ○ |
| STAX/MEMPHIS | ⦿ | ○ | ○ | ○ | ○ | ○ | ○ |
| PHILLY | ⦿ | ○ | ○ | ○ | ○ | ○ | ○ |
| DOO-WOP | ⦿ | ○ | ○ | ○ | ○ | ○ | ○ |

|  |  |
|---|---|
| FUNK | ⦿ ○ ○ ○ ○ ○ ○ |
| DISCO | ⦿ ○ ○ ○ ○ ○ ○ |
| OLD SCHOOL | ⦿ ○ ○ ○ ○ ○ ○ |
| BLUE-EYED SOUL | ⦿ ○ ○ ○ ○ ○ ○ |
| ADULT CONTEMPORARY | ⦿ ○ ○ ○ ○ ○ ○ |
| QUIET STORM | ⦿ ○ ○ ○ ○ ○ ○ |
| CROSSOVER | ⦿ ○ ○ ○ ○ ○ ○ |
| DANCE/TECHNO | ⦿ ○ ○ ○ ○ ○ ○ |
| ELECTRO/SYNTH | ⦿ ○ ○ ○ ○ ○ ○ |
| NEW JACK SWING | ⦿ ○ ○ ○ ○ ○ ○ |
| RETRO/ALTERNATIVE | ⦿ ○ ○ ○ ○ ○ ○ |
| HIP-HOP | ⦿ ○ ○ ○ ○ ○ ○ |
| RAP | ⦿ ○ ○ ○ ○ ○ ○ |
| GANGSTA | ⦿ ○ ○ ○ ○ ○ ○ |

} — 802

| | |
|---|---|
| PLEASE DESCRIBE THE LEAD SINGER(S). IF NO VOCALS SELECT INSTRUMENTAL | [FEMALE SOLO ▼] — 803 |
| PLEASE DESCRIBE ANY BACKUP VOCALS | [NONE ▼] — 804 |
| PLEASE DESCRIBE THE BAND | [NONE ▼] — 805 |
| SELECT THE MOST IMPORTANT INSTRUMENT | [NONE ▼] — 806 |
| SELECT THE SECOND MOST IMPORTANT INSTRUMENT | [NONE ▼] — 807 |
| SELECT THE THIRD MOST IMPORTANT INSTRUMENT | [NONE ▼] — 808 |

STRONGLY DISAGREE ... NEUTRAL ... STRONGLY AGREE

| | |
|---|---|
| THIS SONG IS A BALLAD | ○ ○ ○ ○ ○ ○ ○ |
| THIS SONG HAS A FULL SOUND | ○ ○ ○ ○ ○ ○ ○ |
| THIS SONG USES A CATCHY HOOK | ○ ○ ○ ○ ○ ○ ○ |

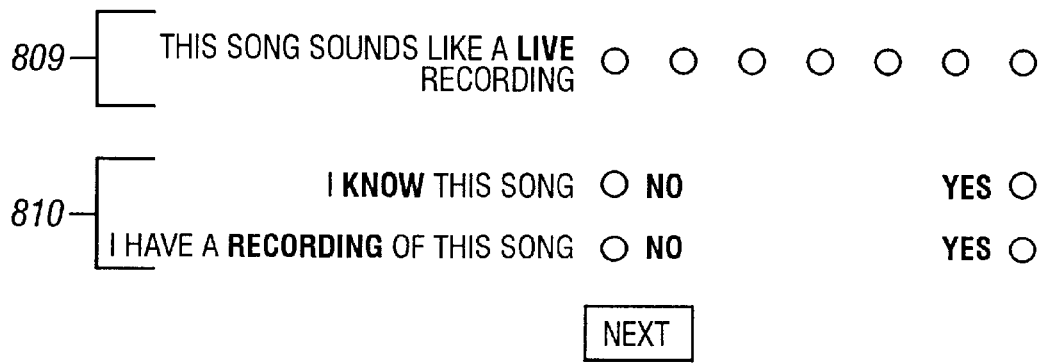
*FIG. 8A3*
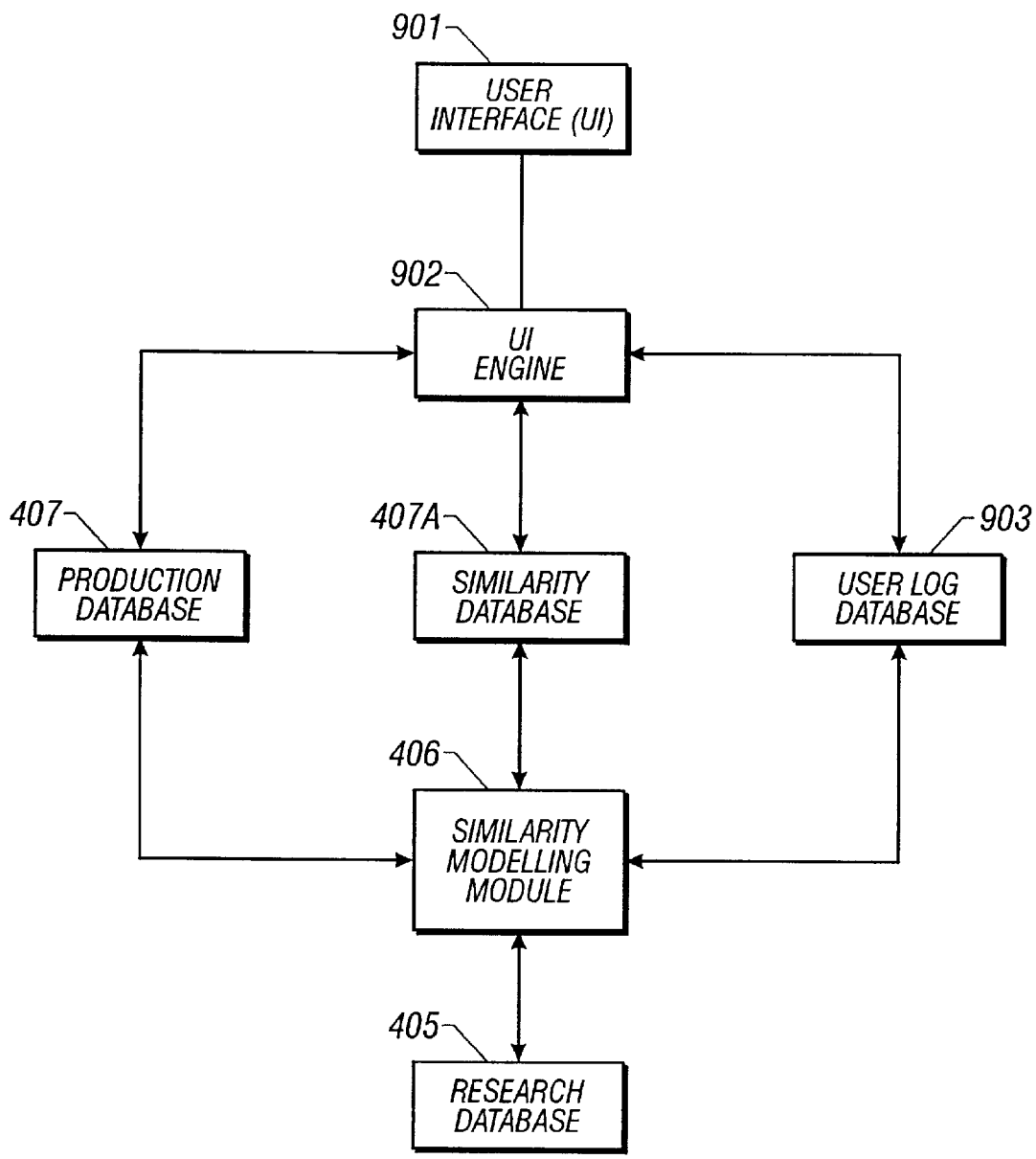
*FIG. 9*

METHOD FOR CREATING A DATABASE FOR COMPARING MUSIC

CROSS REFERENCE TO RELATED APPLICATIONS

The present Application is related to the U.S. patent application entitled "SYSTEM FOR CREATING A DATABASE FOR COMPARING MUSIC ATTRIBUTES", Ser. No. 09/533,720 now pending filed on the same day as the present Application, and assigned to the Assignee of the present invention. The disclosure of the patent application "SYSTEM FOR CREATING A DATABASE FOR COMPARING MUSIC ATTRIBUTES" is hereby incorporated by reference in its entirety.

The present Application is also related to the U.S. patent application entitled "METHOD FOR CONTENT BASED MUSIC SEARCHING", Ser. No. 09/532,921, now pending filed on the same day as the present Application, and assigned to the Assignee of the present invention. The disclosure of the patent application "METHOD FOR CONTENT BASED MUSIC SEARCHING" is hereby incorporated by reference in its entirety.

The present Application is also related to the U.S. patent application entitled "SYSTEM FOR CONTENT BASED MUSIC SEARCHING", Ser. No. 09/532,196, now pending filed on the same day as the present Application, and assigned to the Assignee of the present invention. The disclosure of the patent application "SYSTEM FOR CONTENT BASED MUSIC SEARCHING" is hereby incorporated by reference in its entirety.

The present Application is also related to the U.S. patent application entitled "QUALITY ASSURANCE SYSTEM FOR SCREENING MUSIC LISTENERS", Ser. No. 09/533,013, now pending filed on the same day as the present Application, and assigned to the Assignee of the present invention. The disclosure of the patent application "QUALITY ASSURANCE SYSTEM FOR SCREENING MUSIC LISTENERS" is hereby incorporated by reference in its entirety.

SOFTWARE APPENDIX

This application is being filed with a software code appendix, which contains material that is subject to copyright protection. The copyright owner has no objection to the facsimile reproduction by anyone of the software code or the patent disclosure, as it appears in the Patent and Trademark Office patent files or records, but otherwise reserves all copyright rights whatsoever.

FIELD OF THE INVENTION

The present invention relates to computerized comparison of music based upon music content and listener perception of music attributes.

BACKGROUND

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). The collection of all such publicly available computer files is known as the World Wide Web (WWW).

The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink.

A Web Browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs enable Web Browsers to go directly to any file held on any WWW server.

Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

The advent and progress of the Internet has changed the way consumers buy music CDs. Consumers download digital music using MP3 or SDMI technology, with a click of a mouse, via the Internet. Audio delivery techniques have also made it easy to stream audio from a website to a consumer when a consumer demands.

Although audio delivery methods have become efficient, computerized searching techniques for music are still archaic. Professional and amateur artists have produced millions of music titles, however music searching techniques are comparable to antiquated text based searching techniques.

Music today can only be classified and searched under the name of the artist, album title, and music genre i.e., whether the music falls under the following categories: Alternative, Blues, Country, Folk, Gospel, Jazz, Latin, New Age, R&B, Soul, Rap, Reggae, Rock, etc. If a consumer wants to search for music that has a lead female vocalist, with a prominent instrument, e.g., the saxophone, and the music is a crossover between Pop and Country genres, the current searching techniques will fail to support such a request. Current search techniques cannot compare plural aspects of different genres and provide intelligent interactive search techniques to music listeners.

Text-based search engines have worked well with databases because text can describe variables. However, text alone cannot help in searching music since music is difficult to define by text alone.

Besides music other aspects of our lives for example, cuisine, wine, paintings, movies, videos, and images etc., (collectively referred as "aesthetic commodities") are also not easily searched by text based engines.

Hence what is needed is a system that can define various aspects of music and/or other aesthetic commodities and store attributes describing music and/or aesthetic commodities into a universal, coherent and perceptually relevant database that will allow content based searching.

SUMMARY

The present invention solves the foregoing drawbacks by providing a method and system for creating a database that allows content based searching in the music domain. According to one embodiment of the present invention, the process provides music samples to music listeners, wherein the music listeners include a plurality of average music listeners and a plurality of expert music listeners. Music samples may be provided via the Internet, a private computer network or music CDs.

The process further provides a plurality of questions to the average music listeners and the expert music listeners, wherein the plurality of questions require listener response and every listener response has a corresponding value that determines the value of a feature vector, wherein the feature vectors define music attributes.

The process then compares a plurality of music samples, wherein comparing feature vectors compares the music samples. Thereafter, the process stores the compared data. Examples of some feature vectors defined by the process are as follows:

An emotional quality vector, wherein the emotional quality vector is based upon a music listener's response to questions regarding a music sample indicating if the music sample is Intense, Happy, Sad, Mellow, Romantic, Heartbreaking, Aggressive, or Upbeat, etc.;

A vocal quality vector, wherein the vocal vector is based upon a music listener's response to questions regarding a music sample indicating that the music sample includes a Sexy voice, a Smooth voice, a Powerful voice, a Great voice, or a Soulful voice, etc.;

A sound quality vector, wherein the sound quality vector is based upon a music listener's response to questions regarding a music sample indicating if the music sample has a Strong beat, is simple, has a good groove, is speech like, or emphasizes a melody, etc.;

A situational quality vector, wherein the situational quality vector is based on a music listener's response to questions regarding a music sample indicating if the music sample is good for a workout, a shopping mall, a dinner party, a dance party, slow dancing, or studying;

A genre vector, wherein the genre vector depends upon an expert listener's response to the questions regarding a music sample indicating if the music sample belongs to a plurality of genres including, Alternative, Blues, Country, Electronic/Dance, Folk, Gospel, Jazz, Latin, New Age, R&B, Soul, Rap, Hip-Hop, Reggae, Rock or others;

An ensemble vector, wherein the ensemble vector depends upon an experts listener's response to questions regarding a music sample indicating whether the music sample includes a female solo, male solo, female duet, male duet, mixed duet, female group, male group or instrumental; and An instrument vector, wherein the instrument vector depends upon an expert listener's response to questions regarding a music sample indicating whether the music sample includes an acoustic guitar, electric guitar, bass, drums, harmonica, organ, piano, synthesizer, horn, or saxophone.

One of the advantages of the present system is that feature vectors can describe music content. This assists in creating a music space for various attributes of music.

Another advantage of the present invention is that since the feature vectors define music attributes, music can be searched based upon music content.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 5B is a flow diagram of computer executable process steps for developing a questionnaire.

FIG. 5C1 is a block diagram of a neural network as used by the present invention.

FIG. 5C2 is a flow diagram of computer executable process steps showing various operations performed by the neural network, according to the present invention.

FIG. 5C3 is a flow diagram of computer executable process steps showing various operations performed by a Modeling Module, according to the present invention.

FIG. 5D is a graphical representation of a plurality of music spaces created by the present invention.

FIG. 5F is an example of storing listener responses to music samples, according to the present invention.

FIG. 6 shows sample data fields for collecting music listener information.

FIG. 7A1 shows sample questions for a plurality of music listeners.

FIG. 7A2 shows sample questions for a plurality of music listeners.

FIG. 8A1 shows sample questions for a plurality of expert listeners.

FIG. 8A2 shows sample questions for a plurality of expert listeners.

FIG. 8A3 shows sample questions for a plurality of expert listeners.

FIG. 9 is a block diagram of the overall system, according to another embodiment of the present invention.

The use of similar reference numerals in different Figures indicates similar or identical items.

DETAILED DESCRIPTION OF THE PREFERRED EMBODIMENTS

Figure 1:
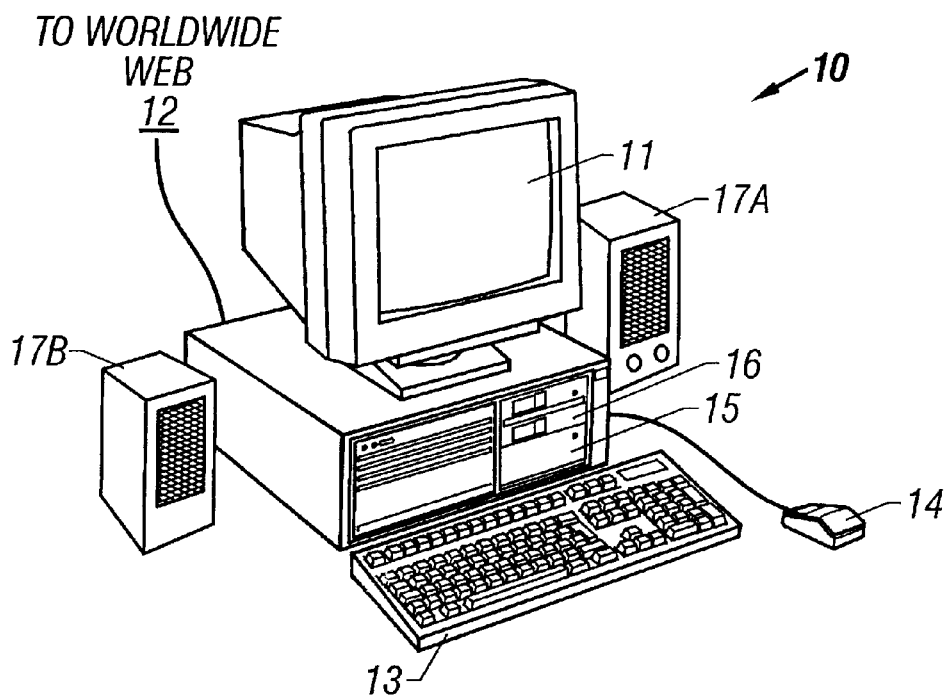
FIG. 1 illustrates a computing system to carry out the inventive technique.

FIG. 1 is a block diagram of a computing system for executing computer executable process steps according to one embodiment of the present invention. FIG. 1 includes a host computer 10 and a monitor 11. Monitor 11 may be a CRT type, a LCD type, or any other type of color or monochrome display. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 can store application programs including web browsers by which computer 10 connects to the Internet and the systems described below, according to one aspect of the present invention.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW). The Internet connection 12 allows computer 10 to download data files, audio files, application program files and computer-executable process steps embodying the present invention.

Computer 10 is also provided with external audio speakers 17A and 17B to assist a listener to listen to music either on-line downloaded from the Internet or off-line using a CD. It is noteworthy that a listener may use headphones instead of audio speakers 17A and 17B to listen to music.

Figure 2:
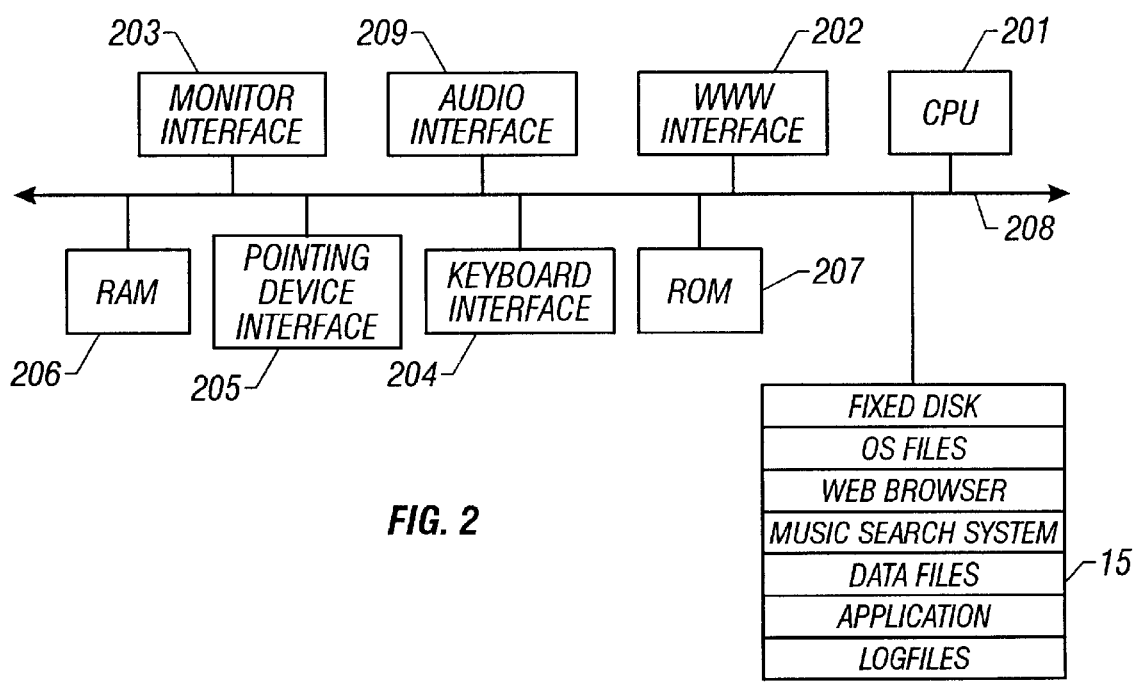
FIG. 2 is a block diagram of the architecture of the computing system of FIG. 1.

FIG. 2 is a block diagram showing the internal functional architecture of computer 10. As shown in FIG. 2, computer 10 includes a CPU 201 for executing computer-executable process steps and interfaces with a computer bus 208. Also shown in FIG. 2 are a WWW interface 202, a display device interface 203, a keyboard interface 204, a pointing device interface 205, an audio interface 209, and a rotating disk 15. Audio Interface 209 allows a listener to listen to music, On-line (downloaded using the Internet or a private network) or off-line (using a CD).

As described above, disk 15 stores operating system program files, application program files, web browsers, and other files. Some of these files are stored on disk 15 using an installation program. For example, CPU 201 executes computer-executable process steps of an installation program so that CPU 201 can properly execute the application program.

A random access main memory ("RAM") 206 also interfaces to computer bus 208 to provide CPU 201 with access to memory storage. When executing stored computer-executable process steps from disk 15 (or other storage media such as floppy disk 16 or WWW connection 12), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 13.

Figure 3:
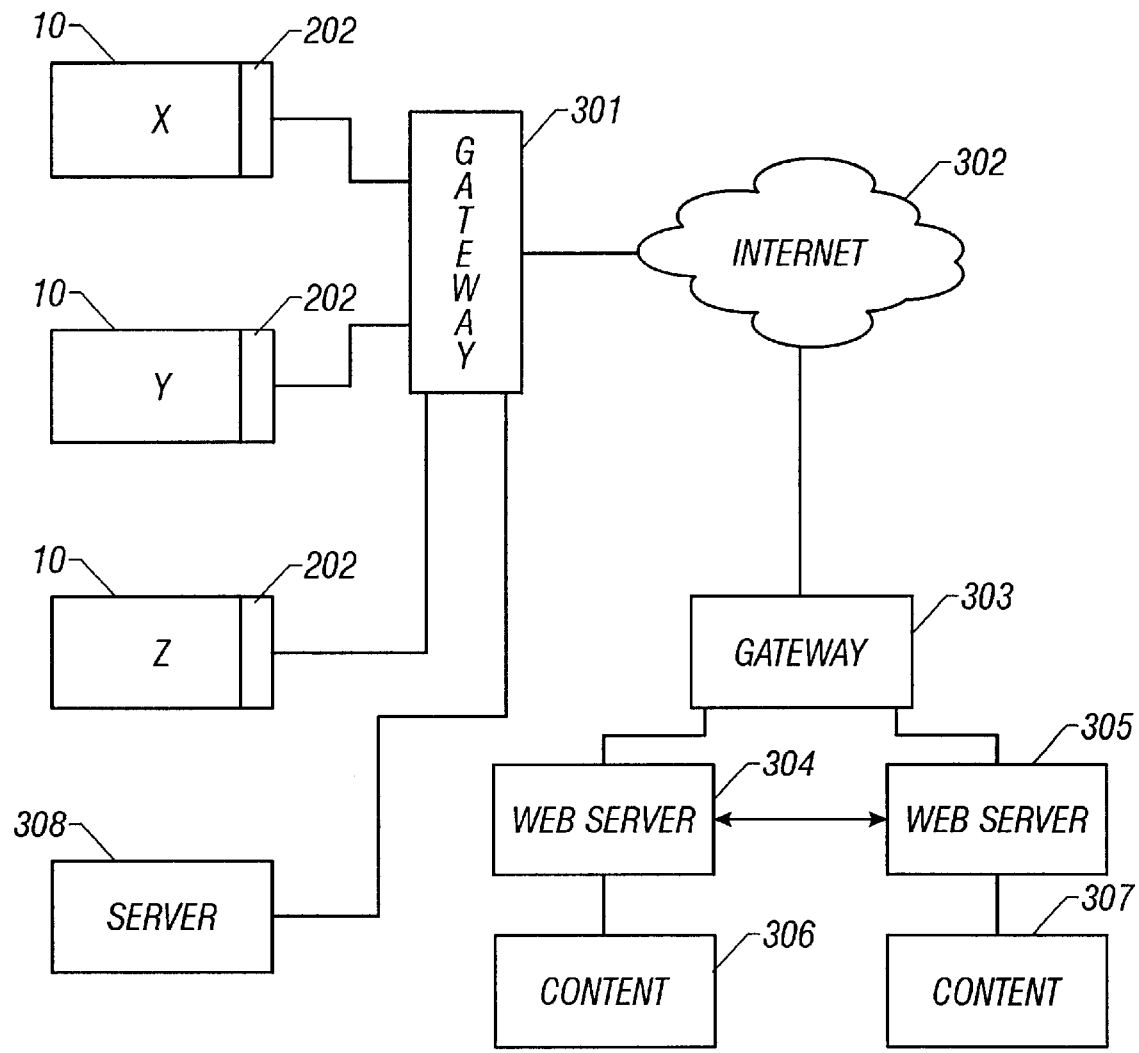
FIG. 3 is a block diagram of the Internet Topology.

FIG. 3 shows a typical topology of a computer network with computers similar to computer 10, connected to the Internet. For illustration purposes, three computers X, Y and Z are shown connected to the Internet 302 via Web interface 202 through a-gateway 301, where gateway 301 can interface N number of computers. Web interface 202 may be a modem, network interface card or a unit for providing connectivity to other computer systems over a network using protocols such as X.25, Ethernet or TCP/IP, or any device that allows, directly or indirectly, computer-to-computer communications.

It is noteworthy that the invention is not limited to a particular number of computers. Any number of computers that can be connected to the Internet 302 or any other computer network may be used.

FIG. 3 further shows a second gateway 303 that connects a network of web servers 304 and 305 to the Internet 302. Web servers 304 and 305 may be connected with each other over a computer network. Web servers 304 and 305 can provide content including music samples, audio clips and CDs to a user from database 306 and/or 307. Web servers 304 and 305 can also host the present music searching system, according to the present invention. Also shown in FIG. 3 is a client side web server 308 that can be provided by an Internet service provider.

Figure 4:
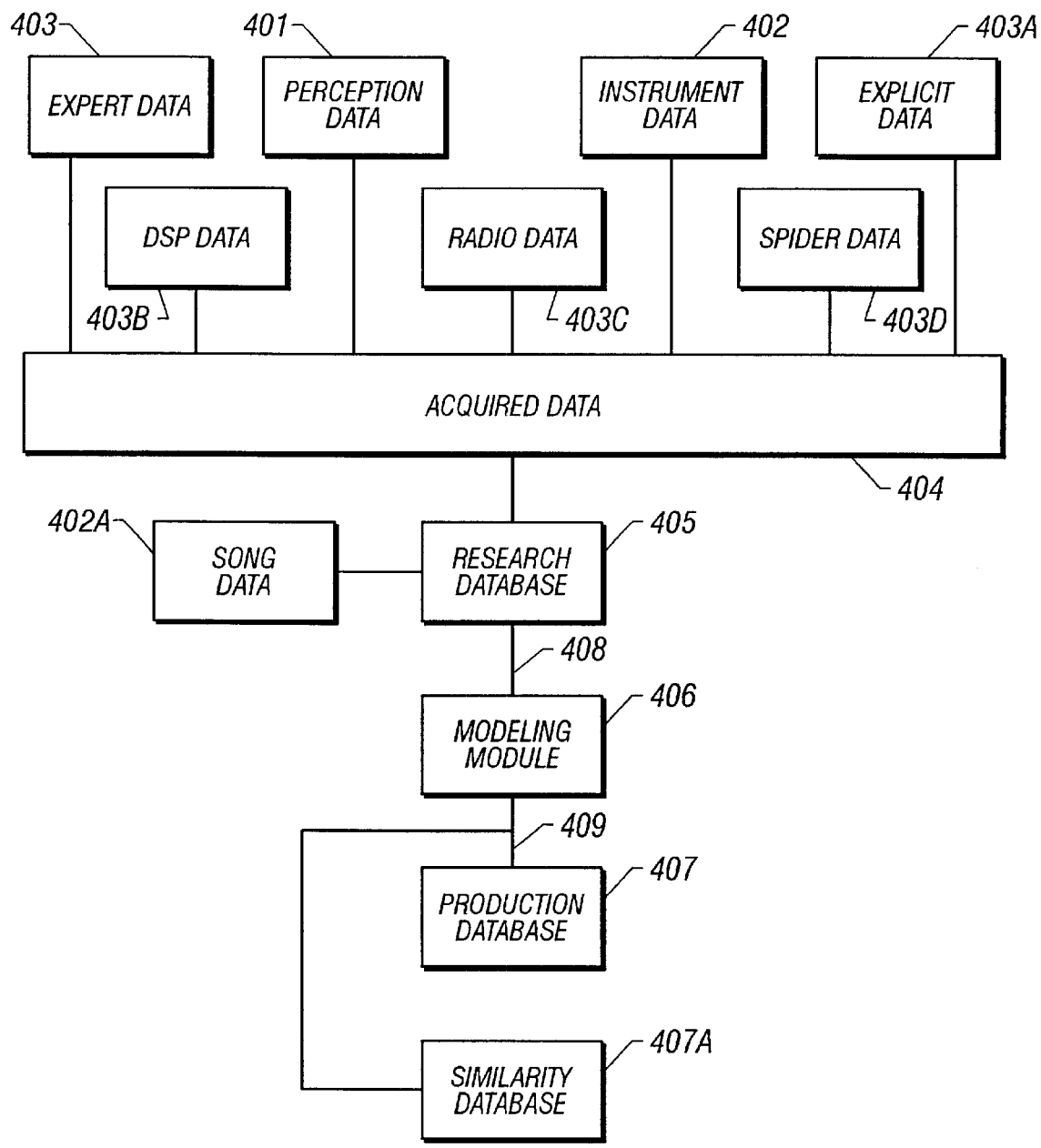
FIG. 4 is a block diagram of the various components used for creating a database structure according to one embodiment of the present invention.

FIG. 4 is a block diagram showing various components that may be used to develop a database that allows music listeners to search for music based upon music content, perceptual qualities of music and music attributes, according to one embodiment of the present invention. Listener perception data 401, Instrument information data 402, Expert Information data 403, and Explicit Pairwise data 403A are collected and then stored as Acquired data 404 and thereafter fed into a Research database 405 (also referred as "R&D database"). Basic music fact data 402A, including title of the music, category/genre if known, and date of 2 recording etc. is also sent to R&D database 405. Data describing music attributes may also be collected by Digital Signal processing ("DSP") and stored as DSP data 403B, Radio logging and stored as Radio logged data 403D, and Internet Harvesting and stored Internet Harvested data 403E, using Spider techniques.

Data from R&D database 405 is sent to a Modeling Module 406 that creates a multi-dimensional music space based upon the acquired data, and performs a similarity analysis on the music samples, as described below in FIG. 5C3. Modeled data from 409 is sent to a production database 407 that stores music data and allows a listener to search music based upon plural attributes as described below. A similarity database 407A is also shown that includes similar music sets that are not accurately modeled by Modeling Module 406, as discussed below.

Creating a Production Database

Figure 5A:
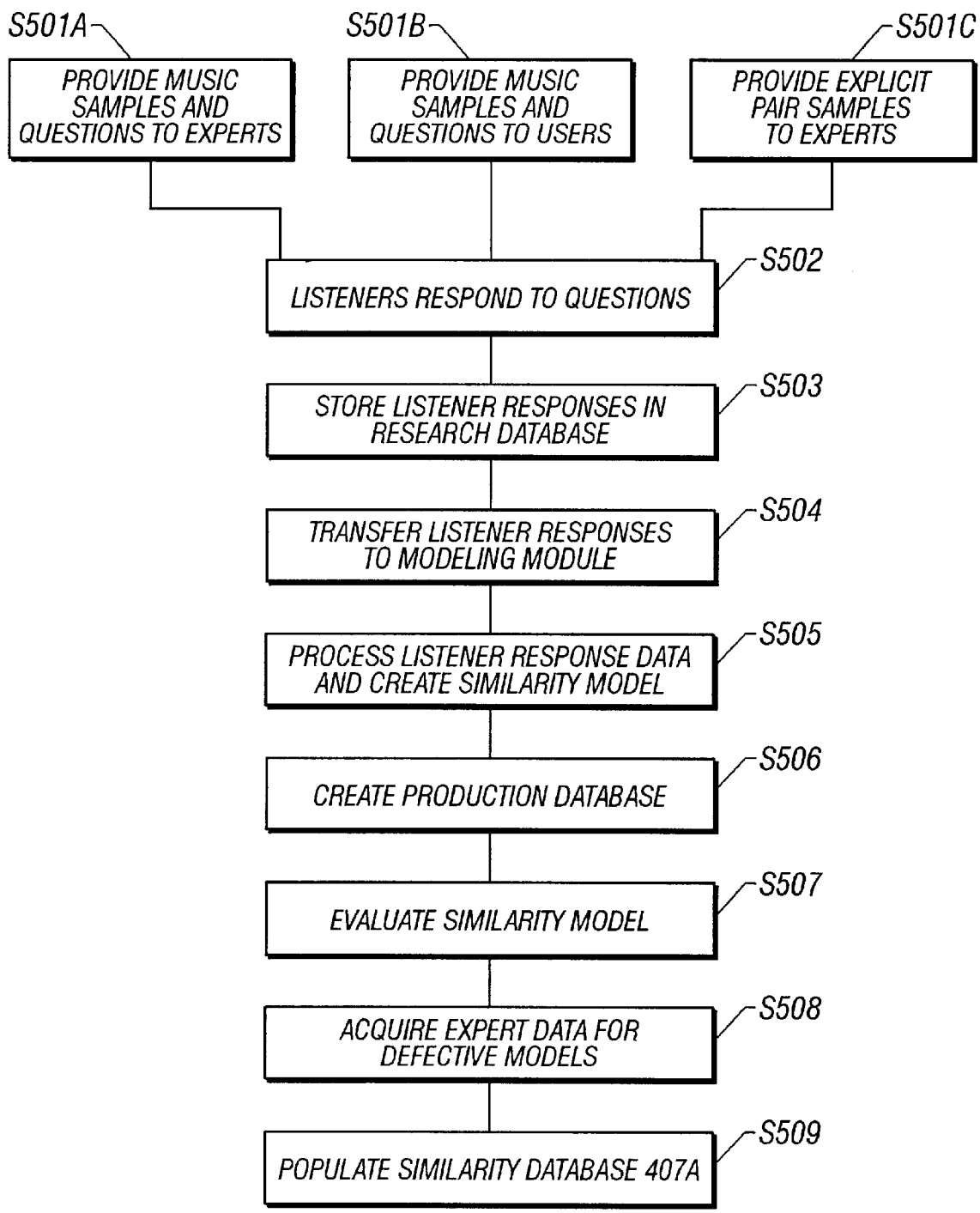
FIG. 5A is a flow diagram of computer executable process steps for creating a database, according to the present invention.

FIG. 5A is a flow chart showing process steps to create a dynamic database that allows comparison of music, based upon music attributes/content and perceptual quality of music based upon data collected from actual music listeners. It is well known that music affects different people in different ways. Every piece of music provides listeners certain experiences including emotional experiences. The present invention provides descriptors/variables that can describe human experience while listening to music and link the variables/descriptors (via feature vectors) to specific music types/genres.

Data Collection from Music Listeners

In step S501A, listeners are provided music samples either on-line via the Internet or on a CD-ROM, with a list of questions corresponding to the music samples. The questions are used to solicit listener responses that describe music attributes and assign values to feature vectors for the attributes. A listener using computer X (FIG. 3) may download music samples from a web server 304/305 with a list of questions. The present invention provides a questionnaire that evaluates the cognitive, emotional, esthetical, and situational effects of music on actual listeners.

Prior to providing music samples or questions, listener information may also be collected, as shown in FIG. 6. Before a listener can start listening to sample music, a training session may be conducted to familiarize a listener with the music rating process.

FIGS. 7A1 and 7A2 show an example of a list of questions that are provided to a listener prior to, after or while a listener is listening to the music sample. A listener that listens to more than one song is also asked to compare songs.

Examples of questions in FIGS. 7A1 and 7A2 may be grouped as follows:

Cognitive (Questions 700A, FIG. 7A1):
This song is similar to the previous song
I like this song
This tune sticks in my mind
This song is simple
This song tells a story
This song emphasizes the melody
This song emphasizes the vocals
This song is speech-like
This song has a strong beat
This song is fast
This song has a good groove
Emotion ( 700B, FIGS. 7A1 and 7A2):
This song is intense
This song is upbeat
This song sounds aggressive
This song is relaxing
This song is mellow
This song is sad
This song is romantic
This song expresses a broken heart
Esthetics (Questions 700C, FIG. 7A2):
The singer has a smooth voice
The singer has a soulful voice
The singer has a powerful voice
The singer has a truly great voice
This song has a high voice
This song has a sexy voice Social behavior (Questions 700D, FIG. 7A2):
This song would be good for easy listening
This song would be good for a wild dance party
This song would be good for slow dancing
This song would be good for a workout
This song would be good in a shopping mall
Other questions like 700E (FIG. 7A2) ask the listener if the listener knows the music or has a recording of the sample. Question 700F (FIG. 7A2) asks the listener if the listener can describe the situations where the music will be appropriate, and if the music sample reminds the listener of an artist(s) or song. Question 700G (FIG. 7A2) asks the listener to describe the song in other words.

Every question requires a response. Based upon listener response, a value is assigned to a feature vector that defines music attributes. Appendix "A" provides an example of assigning feature vector values to listener responses.

Data Collection from Music Experts

Not every music listener is competent to rate and analyze music styles and instruments that are used in a music sample. Hence expert data 403 is collected from expert music listeners who may be individuals trained in the field of music or are more knowledgeable in the field of music than an average listener.

Referring back to FIG. 5A, in step S501B, expert data 403 is collected by providing music samples to experts accompanied by a plurality of questions. Music samples and questions to expert music listeners may be provided over the Internet, a private network and/or music CDs, etc. For example, a music expert using computer X (FIG. 3) may download music samples from a web server 304/305 with a list of questions.

FIGS. 8A1, 8A2 and 8A3 provide an example of the questions that a music expert may be asked for collecting expert data 403. An expert may be asked questions 801 (FIG. 8A1) to identify music genre, for example, whether a music sample belongs to, an Alternative, a Blues, a country, an Electronic/Dance, a Folk, a Gospel, a Jazz, a Latin, a New Age, a R&B/Soul, a Rap/Hip-Hop, a Reggae and a Rock style of music. The expert is not limited to choosing a single genre, instead, the expert may choose plural genres to identify a particular music sample.

Questions 801 establish the importance of a particular music style in a given sample, and also determine crossover between different genres. For example, if an expert that listens to a music sample and gives a high rating for Blues and Country in questions 801, then the music sample may have a cross-over between Blues and Country style.

Within the various genres mentioned above, there may also be sub styles, for example, Gospel, Motown, Stax/Memphis, Philly, Doo-wop, Funk, Disco, Old School, Blue-eyed soul, Adult contemporary, Quiet storm, Dance/techno, Electro/Synthetic, New Jack Swing, Retro/Alternative, Hip Hop, Rap and Gangsta etc. Question 802 (FIGS. 8A1 and 8A2) requires an expert to rate music sub-styles. This determines the sub-genre of a music sample.

In question 803 (FIG. 8A2), an expert identifies whether a music sample is instrumental or vocal. If music is primarily vocal, then the expert also identifies if the lead vocalist is a male or female. In question 804, the expert describes backup vocalist(s), if any.

In question 805 (FIG. 8A2), an expert describes a band, if any, associated with a music sample.

In questions 806, 807 and 808 (FIG. 8A2), the expert identifies the three most important instruments that may exist in a music sample.

In questions 809 (FIGS. 8A2 and 8A3), an expert is given standard statements and an expert either agrees or disagrees with various levels of conviction.

In questions 810 (FIG. 8A3), an expert acknowledges if the expert is aware of the music and/or has a recording of the music.

All expert responses to the foregoing questions assign specific values to the music feature vectors. An example of how feature vector values are assigned for music samples is provided in Appendix "A".

It is noteworthy that the questions in FIGS. 7A1, 7A2 8A1, 8A2 or 8A3 are merely illustrative and do not limit the scope of the invention. The number and format of the questions as presented to music listeners or expert listeners may be different than what is shown in FIGS. 7A1, 7A2, 8A1, 8A2 or 8A3.

Figure 7B:
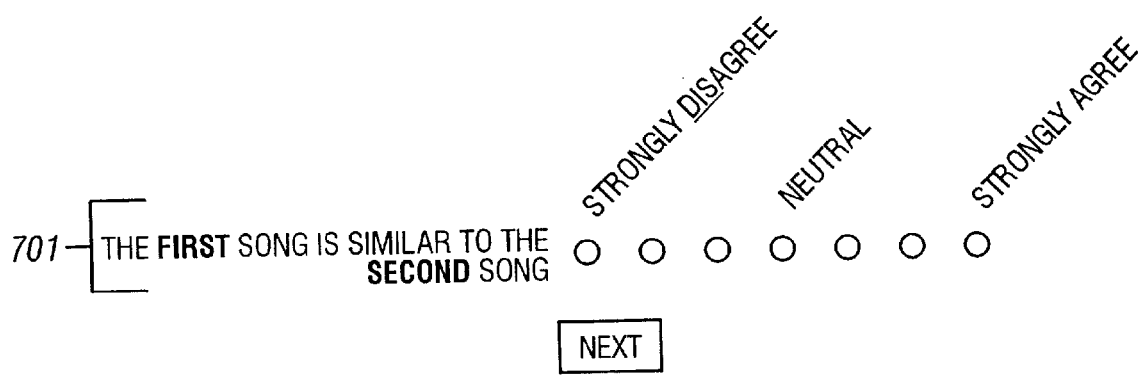
FIG. 7B shows sample questions asked to a plurality of expert music listeners for obtaining explicit similarity data for music samples.

Referring back to FIG. 5A, in step S501C, explicit "pairwise" questions are provided to expert music listeners. FIG. 7B shows an example of questions 701 that may be asked. Expert music listeners are provided with a pair of music samples and experts rate the similarity of the samples. Although music is provided in pairs for evaluation, the invention is not limited to providing music samples in pairs. Various other presentation techniques may be used, for example, music samples may be provided as a group of three, and so forth.

It is noteworthy that the invention is not limited to the steps of FIG. 5A for collecting data that describe music attributes. Various other methods may be used, as described below:

Data may be collected as DSP data 403B using DSP techniques. DSP techniques includes analyzing digitized audio files containing music into a set of feature vectors which can be used to characterize and compare music. Thus, an audio file for any music is transformed into a set of numbers (feature vectors) which describes the qualities of the music. These numbers are constructed so that they represent the important or relevant features.

Radio logging is another method for collecting data that can describe music. Data stored via radio logging is stored as radio log data 403B. Radio stations play sets of coherent music and avoid playing music that is likely to unpleasantly surprise their listeners. Thus, radio station play lists provide an implicit measure of similarity based upon the assumption that music played within the same set are likely to have common features. By collecting radio station play lists co-occurrence of music in play lists may be used as a measure of similarity, similar to explicit pairwise data 403A.

One approach would be to measure the conditional probability of playing music B within a pre-defined time interval after music A has been played. Music with a higher conditional probability is assumed to be more similar. A second approach would be to construct the entire conditional probability distribution over time for each pair of songs. For example, construct the distribution of time until music B is played, given that Music A has already been played. These entire distributions could then be compared by using a Kullback-Leibler metric as described in "Elements of Information Theory" by T. M. Cover and A. T. Joy. (1991), published by John Wiley & Songs Inc., and incorporated herein by reference.

Internet harvesting may be also used to collect Internet harvested or "Spider data" 403E. Spiders are well known and collect data of users that browse the Internet. A similar strategy to that of radio logging can be applied for Internet harvesting. Co-occurrence analysis can be carried out on a plurality of web pages. One approach would involve computing the frequency of co-occurrence of artist names on a. large sample of web pages. Those artist with higher frequencies of co-occurrence are more likely to have features in common than artists with lower frequencies of co-occurrence. A similar analysis can be conducted for music titles, for albums and music labels etc.

Questionnaire Development

The questions in steps S501A, S501B and S501C are designed to achieve accurate ratings for music samples. There are numerous ways in which a question regarding a music sample may be asked to evoke plural responses from music listeners. For example, if the level of "Happiness" after listening to a piece of music is to be determined, then questions may be phrased as follows:

"Rate the song for Sadness - - - Happiness

Rate the song if it is Not Happy - - - Happy

Strongly Disagree - - - Strongly Agree that the song is Happy"

Each method of asking questions may evoke similar or dissimilar results from music listeners and/or experts. The present invention evaluates questions for form and content to obtain responses that are accurate and can be used efficiently in rating music.

FIG. 5B is flow diagram of the methodology used for evaluating questions, prior to presenting the questions to listeners in steps S501A, S501B and S501C (FIG. 5A).

In step S5001, a basic set of questions is developed to ascertain predefined music attributes. For example, as shown above, a basic set of questions is designed with the intent to determine the degree of "happiness" that may be provided to a listener by a piece of music.

In step S5002, plural sets of questions are developed based upon the basic question set in step S5001. For example, as shown above a plural set of questions to determine the degree of "happiness" evoked by a piece of music may be stated as follows:

"Rate the song for Sadness - - - Happiness

Rate the song if is Not Happy - - - Happy Strongly Disagree - - - Strongly Agree that the song is Happy"

In step S5003, the plural sets of questions are provided to different sets of listeners with music samples. The plural sets of questions are multiple ways to ask a similar question regarding a music sample.

In step S5004, plural sets of listeners respond to the plural set of questions after listening to music samples, and the answers to the questions are evaluated. Questions may be evaluated for plural criteria as described below. A questionnaire that produces optimum and accurate results is chosen for collecting data in steps S501A–C (FIG. 5A).

Examples of some of the techniques to filter out inaccurate questions are provided as follows:

(a) Consensus: Questions that produce a lack of consensus between music listener ratings are generally inaccurate and hence are rejected. Consensus in ratings may be measured in plural ways, for example:

$$\text{Consensus}(i) = -1 * [\text{Mean (music)}(\text{Std Dev (listener)}(\text{question }(i)))]$$

Consensus (i) is the measured consensus value for an ith question;

Std Dev(listener)(question (i)) is the standard deviation of the ratings for each music sample based upon question (i), for example if five listeners have rated a music sample for a particular attribute and the rating values are R1, R2, R3, R4 and R5, then the Standard deviation of R1, R2, R3, R4 and R5 is labeled as Std Dev (listener)(question (i)). Standard deviation of ratings for different music samples for a specific question is calculated and may be designated as STD1, STD2, STD3, . . . STDn, where n is the nth question; and Mean (Music) (Std Dev(listener) (question (i))is the mean of STD1 . . . STDn.

Multiplying by a negative number (for example −1 as shown above), reverse orders the statistical values since low standard deviation values correspond to high levels of consensus among music listener ratings.

(b) Discrimination ability: Questions are evaluated such that they allow discrimination in music listener ratings for specific music samples. Questions that do not allow discrimination between samples are rejected.

Discrimination may be measured as follows:

$$\text{Discrimination } (i) = \text{Std Dev (music) (Mean (listener)(question } (i)))$$

where Mean (listener)(question(i))is calculated as follows: if a music sample 1 has ratings R1, R2, R3, R4 and R5 from five different listeners, then the Mean for the music sample is calculated by (R1+R2 +R3+R4+ R5)/5. This mean may be designated as M1. Mean for other music samples are also calculated and may be designated as M2 . . . Mn, where n is the nth sample. Mean (listener)(question(i))) is the mean of (M1+ M2+ - - - Mn)/n; and Std Dev (music) (Mean (listener)(question (i))) is the standard deviation of M1, M2, M3, M4 and M5. Questions with low standard deviation values do not discriminate between music samples. In contrast, questions with high standard deviation values discriminate between music samples. These latter questions (with high standard deviation values) are more informative compared to the questions with low standard deviation values.

(c) Model Based Variance: The usefulness of questions can also be evaluated by examining the contribution of each question within the context of a pre-defined model. One such model is derived by using dimensional reduction techniques such as Principal Components Analysis ("PCA"). Details of the foregoing techniques are provided in "Multivariate Analysis, Methods and Applications" by William R. Dillon & Matthew Goldstein (1984), published by John Wiley & Sons, and in "Multivariate Observations" by G. A. F. Seber, (1984), published by, John Wiley & Sons, both of which are incorporated herein by reference.

In this technique, a matrix of questions is created. The matrix can be considered as describing each piece of music as a vector in a "question space", defined by the question matrix. For example, a piece of music, e.g., Sample 1, may be described by average listener responses to a set of questions. Average listener responses may be represented as a vector corresponding to a single column of a matrix (M1), where M1 includes music samples as columns and listener responses as rows. Thus an ijth entry in M1 is the average response on the ith question for the jth music sample. Hence, matrix M1 can be described as a q×s matrix, where q is the number of questions and s is the number of music samples. Hence every music sample is represented as vector in the question space defined by average listener responses.

PCA also derives a rotation matrix (RM) which has dimensions q×q, where q is the number of questions used and is same as the row dimension of M1. RM has the following properties: (1) dimensions (or matrix entries) in RM are orthogonal, so that the matrix entries do not overlap in representing information about music samples, and 2) the dimensions or basis vectors represented as RM entries are arranged based upon the amount of variance caused by the questions in the question space.

Matrix entries in the RM show each question's contribution to the variance in average listener responses. Questions that substantially contribute to the variance across music samples are desirable and are retained whereas questions that do not may be rejected.

(d)Rejected questions are questions that, when excluded produce least deterioration in a similarity model. Excluding certain set of questions for collecting data and as discussed below in step S505, evaluating the similarity model based on the included set of questions provides the relative contribution of the questions.

In step S5005, questions that provide accurate results in the modeling process are retained and then eventually provided to listeners in steps S501A, S501B and S501C (FIG. 5A).

Establishing Feature Vectors

In step S502, listeners respond to plural questions from steps S501A–S501C.

In step S503, plural listener responses to the plural questions are collected. The various questions answered by music listeners or by music experts provide values to a plurality of feature vectors that are used to define music attributes, and the feature vectors are then used to compare and search music based upon music content. As discussed below, various feature vectors are used to create a plurality of music spaces that define the location of a piece of music in a specific music space.

Appendix "A" provides an example of numerous feature vectors that may be used to define music samples with feature vectors.

Examples of certain vectors to define music attributes are provided below:

(a) Emotional quality vector: This vector is based upon the emotional response derived from a listener by a particular piece of music, for example, whether music samples are:

Intense

Sad

Mellow

Romantic

Broken-hearted

Aggressive

Upbeat

Emotional quality vector values are based upon listener response to questions 700B (FIGS. 7A1 and 7A2). The foregoing examples and the questions in 700B are merely illustrative and are not intended to limit the scope of the invention. As discussed below, emotional quality vector is used to define an emotional quality space.

(b) Vocal quality vector: A vocal quality vector is based on the vocal qualities of a particular piece of music, for example, whether a music sample has a:

Sexy voice

Smooth voice

Powerful voice

Great voice

Soulful voice

Vocal quality vector values are based upon listener response to questions 700C, in FIG. 7A2. The foregoing examples and the questions in 700C are merely illustrative and are not intended to limit the scope of the invention. As discussed below, vocal quality vector is used to define a vocal quality space.

(c) Sound quality vector: A vector based on the vocal quality of a particular music sample, for example, whether a music sample has a:

Strong beat
Is Simple
Has a good Groove
Is Fast
Is speech like
Emphasizes a melody Sound quality vector values are based upon listener response to questions 700A (FIG. 7A1). The foregoing examples and the questions in 700A are merely illustrative and are not intended to limit the scope of the invention. As discussed below, sound quality vector is used to define a sound quality space.

(d) Situational vector: A vector that establishes the optimum situation in which a particular piece of music may be used, for example, whether a music sample is:

Good for a workout
Good for a shopping mall
Good for a dinner party
Good for a dance party
Good for slow dancing
Good for studying
Good for driving
Good for relaxing Vocal quality vector values are based upon listener response to questions 700D (FIG. 7A2). The foregoing examples and the questions in 700D are merely illustrative and are not intended to limit the scope of the invention. As discussed below, situational quality vector is used to define a sound quality space.

(e) Genre vector: A vector that determines the genre or a genre combination of a particular piece of music, for example, whether a music sample belongs to the following genres or a combination of the following genres:

Alternative
Blues
Country
Electronic/Dance
Folk
Gospel
Jazz
Latin
New Age
R&B/Soul
Rap/Hip-Hop
Reggae
Rock Genre vector values are based upon listener response to questions in 801 and 802 (FIGS. 8A1–8A2). The foregoing examples and the questions in 801 and 802 are merely illustrative and are not intended to limit the scope of the invention. As discussed below, genre vector is used to define a genre space.

(f) Ensemble Vector: A vector based upon music's ensemble, for example, if a music sample includes:

Female solo
Male solo
Female duet
Male duet
Mixed duet
Female group
Male group
Instrumental Ensemble vector values are based upon listener response to questions in 803 and 804 (FIG. 8A2). The foregoing examples and the questions in 803 and 804 are merely illustrative and are not intended to limit the scope of the invention. As discussed below, ensemble vector is used to define an ensemble space.

(g) Instrument vector: An instrument vector is based upon the level of importance of a particular instruments, for example, if a music sample includes an:

Acoustic guitar
Electric guitar
Bass
Drums
Harmonica
Organ
Piano
Synthesizer
Horn
Saxophone
Strings Instrument vector values are based upon listener response to questions in 806, 807 and 808 (FIG. 8A2). The foregoing examples and the questions in 806,807 and 808 are merely illustrative and are not intended to limit the scope of the invention. As discussed below, instrument vector is used to define an instrument space.

As discussed above, DSP techniques may also be used to acquire DSP data 403B that can be used to construct feature vectors. One such DSP technique for constructing a DSP feature vector is as follows.

(a) Extract information from a given audio file. The well-known .wav format or any other format may be used to represent an audio file.

(b) Extracted information is represented as a long vector of numbers, which correspond, to the amplitude of an audio signal as a function of time. This vector may be transformed into a spectrogram, which represents the audio file as a time-frequency matrix. Each row of the spectrogram represents instantaneous energy (as a function of time) within a particular frequency band. Each column of the spectrogram represents the instantaneous energy at a particular point in time across a set of feature bands. For a typical 30 second segment of a song, sampled at CD quality (44.1 KHz) the spectrogram may be large and cumbersome. To simplify computation and reduce processing time, the spectrogram may be sub-sampled. The reduced spectrogram is then processed.

(c) For each frequency band the process computes the Fourier transform which characterizes the periodic structure within each band. The process keeps the magnitude of the Fourier transform and ignores the phases of each periodic component.

(d) Construct a representation of the periodic structure of a piece of music within each of set of frequency bands. This set of numbers can be characterized as a feature vector. With a metric (e.g. a Euclidean metric) these feature vectors may be compared, so that vectors with smaller distances are closer to each other than vectors that are farther apart.

In step S503, listener responses are stored in R&D database 405, and in step S504, acquired data 404 collected in step S502 is transferred to Modeling Module 406.

Modeling of Acquired Data

In step S505, Modeling Module 406 analyzes acquired data 404 and also performs a similarity computation. The similarity computation determines the optimum function that can represent similarity between different music samples, based upon defined music attributes (i.e. feature vector values).

For example, assume that a first music sample may be defined by a vector VA, where VA=(V1, V2 ... Vn) and V1, V2 ... Vn are music attributes based upon data collected above. A second music sample may be defined by a vector VB, where VB=[V1', V2' ... Vn'], and V1', V2' ... Vn' are music attributes based upon data collected above. Modeling Module 406 compares vectors VA and VB using a similarity function F(VA,VB). The method for calculating F(VA,VB) is described below. The foregoing example is merely to illustrate the functionality of Modeling Module 406 and does not limit the invention.

The discussion below illustrates the various steps performed by Modeling Module 406.

A feature vector v for a set of music samples may be V=(V1,V2, V3 ... Vn), where V1 ... Vn values are based upon plural responses received in steps S501A and S501B. A matrix S can be defined as a n×p matrix to represent vector V, where p is the number of music samples in the set, hence, S=[V1|V2|V3| ... VN].

For computational ease, matrix S can be reduced to a smaller matrix S', where S' is a m×p where m<n. Hence S represents a set of p music samples in a n dimensional space, and S' represents the same set in m dimensional space, where m<n.

To create matrix S', various dimensional reduction techniques such as Principal Component Analysis, Multi-dimensional Scaling or related techniques may be used. Such techniques are described in "Multivariate Observations" by G. A. F. Seber, (1984), referenced above. It is noteworthy that S' is created so that fewer vectors are used for performing a similarity analysis as described below, without losing essential information from matrix S.

Subsets of each vector V may also include vectors that are defined in specific music spaces. For example vector V1 can include vectors Vg, Ve, Vt, Vv and Vi, where Vg represents a piece of music sample in a genre space, Ve represents a piece of music in a emotional quality space, Vt represents a piece of music in a tempo space, Vv represents a piece of music in a voice quality space, and Vi represents a piece of music in a instrument space. Vg, Ve, Vt, Vv and Vi may be represented as follows:

$Vg=(Vg1, \ldots Vga)$ $Ve=(Ve1, Ve2 \ldots Veb)$ $Vt=(Vt1, Vt2 \ldots Vtc)$ $Vv=(Vv1, Vv2 \ldots Vvd)$ $Vi=(Vi1, Vi2, \ldots Vie)$ Also, based upon data collected in step S501C, a representative matrix S1 is created that includes perceived similarity data of plural music pairs, illustrated for convenience as pair i,j. Generally, matrix S1 shall include ratings that illustrate similarity and/or dissimilarity between a pair of music.

Furthermore, Modeling Module 406 calculates a distance matrix D that estimates the distances between pairs of music samples in matrix S1. Distances between pairs of music samples may be calculated in more than one music space. One method of calculating distance is the Euclidean distance, illustrated as Dij, where $Dij = \text{SQRT}\ [(Vi1-Vj1)^2+(Vi2-Vj2)^2 - - - (Vik--Vjk)^2]$ where Vi1, Vi2 ... Vik are feature vector values for the ith music sample, and Vj1, Vj2 - - - Vjk are feature vector values for the jth music sample. The feature vector value specifies the location of the music sample in a particular space. It is noteworthy that Dij is not limited to Euclidean distance, and that any mathematical technique that can illustrate the distance between the vectors can be used.

Distance matrix Dij is created for plural music spaces, and may be illustrated as Dg (distance between music sample i and j in the genre space), De(distance between music sample i and j in the emotional quality space), Dv(distance between music sample i and j in the vocal quality space), Dt (distance between music sample i and j in the tempo space) and Di (distance between music sample i and j in the instrument space). The methodology of creating individual and combined spaces is described below.

A function Fij represents the distances between music sample i and j and may be illustrated as:

$WgDg+WeDe+WvDv+WtDt+WiDi,$ where Wg, We, Wv, Wt and Wi are individual weights allocated to individual music spaces. The plural weights Wg, We, Wv, Wt and Wi are calculated such that S1 and Fij are at a minimum distance from each other. Essentially a function F is determined to model the observed or "true" similarity between music represented in the matrix S1. Thus the derived function F may be applied generally to all pairs of music I and j, not just those reflected in the matrix S1.

Function Fij may be fit by using linear regression or by nonlinear regression techniques as disclosed in "*Generalized Linear Models*" by McCullagh & Nelder, and *Generalized Additive Models* by Hastie & Tibshirani, both published by Chapman and Hall, and incorporated herein by reference in their entirety.

other tools may be used to compute the weights shown above and fit function Fij, as follows:

(a) Bayesian estimation techniques as disclosed in "An Introduction to Bayesian Statistical Decision Process" by Bruce W. Morgan, (1968) published by Prentice-Hall, Inc., and "Learning Bayesian Networks" by Heckerman D & D. Geiger, (1994), may be used and are incorporated herein by reference in their entirety. Essentially, Bayesian techniques choose a model distribution for S1 entrees and then find the foregoing weights for Fij that maximize an appropriate likelihood function. For example, if the distribution of S1 entries is a Gaussian distribution, then the likelihood function is a function that would maximize the probability of the observed values of S1 with the given parameters of the Gaussian distribution and the weights used to combine spaces.

Standard Maximum Likelihood Estimation techniques are disclosed in "Elements of Statistical Computing" by R. A. Thisted (1988), published by Chapman & Hall) and in "Bayesian Data Analysis" by A. Gelman, J. Carlin, H. S. Stern & D. B. Rubin (1995), published by CRC Press, may be used for determining the foregoing weights, and both are incorporated herein by reference in their entirety.

(b) Neural Network techniques as disclosed in "Neural Networks, a Comprehensive Foundation", by Haykin, S., (1994), published by Macmillan, and incorporated herein by reference in their entirety may also be used to calculate the foregoing weights and model similarity between S1 and Fij, and between other music samples.

Neural networks are nonlinear optimization and function-learning algorithms and may be used to model the similarity between S1 and Fij. A simple 3 layer feed forward reverse feed network architecture as shown in FIG. 5C1 may be used.

Input bottom layer is divided into 2 parts, 500C1 and 500C2, each corresponding to feature vectors of the music samples to be compared (for example, songs A and B). A group of network layers 500C4 are fully interconnected (e.g., every node in the input layer (500C1 and 500C2) is connected by a weight to every node in the middle layer( 500C4). The output consists of a single node which reads out the similarity 500C3 between the 2 input songs, A and B.

The neural network 500C5 can be trained with a random set of the pairs of music for which similarity data is available (for example in matrix S1). FIG. 5C2 shows the process steps used for training network 500C5:

Step 1. Select a pair of music samples A and B.

Step 2. Set the input layer values to the feature vectors of music samples A and B.

Step 3. Transfer input layer values forward through the network to the output layer (output node, 500C3).

Step 4. Compare the difference between the computed similarity value, 500C3 and the actual value (from matrix S1).

Step 5. Reverse feed the difference (error signal) through the network 500C5 and adjust weights accordingly.

Step 6. Repeat until the network has achieved the desired performance.

(c) Classification Trees: Techniques disclosed in "Classification and Regression Trees", by Brieman, J. H. Friedman, R. A. Olshen & C. J. Stone (1984), published by Wadsworth, Belmont C A., may also be used to calculate the foregoing weights and perform the similarity analysis, and is incorporated herein by reference in their entirety. Classification trees define a hierarchical or recursive partition of a set based on the values of a set of variables. In the present case, the variables are the elements of plural feature vectors. A decision tree is a procedure for classifying music into categories according to their feature vector values. Expert pairwise data 403A may be used to define a satisfactory decision tree and then the tree may be applied to a larger set of music. This method partitions music samples into mutually exclusive categories, wherein music samples within each category are considered similar.

(d) Hierarchical Clustering: Techniques disclosed in "Multivariate Analysis: Methods and Applications" by William R. Dillon & Matthew Goldstein (1984), published by John Wiley & Sons; and "Multivariate Observations" by G. A. F. Seber (1984),published by John Wiley & Sons, and both are incorporated herein by reference in their entirety, may also be used to calculate the foregoing weights and perform the similarity analysis. Hierarchical clustering methods produce a hierarchical tree structure for a set of data. These methods may be used to partition a music set into a set of similar clusters as follows:

A hierarchical clustering algorithm assigns music samples to a cluster, wherein the cluster is based on the similarity of the feature vectors of plural music samples. Each cluster may belong to a higher level cluster, so that the top-level or root cluster contains all music samples. Thus music samples are arranged in a hierarchy of clusters, each music sample being most similar to those songs in its most "local" or lowest level cluster and successively less similar to songs which belong to only the same higher level clusters.

A function F may assign high similarity scores to pairs of music samples based on the lowest level of the tree structure that samples share in common. For example, music samples, which belong to the same lowest-level cluster, are very similar, whereas songs which have no cluster in common except the root cluster are most dissimilar.

(b) Fuzzy Queries: Techniques provided in "An Introduction to Fuzzy Logic Applications in Intelligent Systems" by R. R. Yager & Lotfi A. Zadeh. (1992), published by Kluwer Academic Publishers, and incorporated herein by reference in their entirety, may also be used to calculate the foregoing weights and perform the similarity analysis. Fuzzy techniques essentially place graded or "soft" constraints on matching criteria rather than on "hard" or Boolean constraints. A fuzzy approach is essentially one in which the degree to which one piece of music is similar to another piece of music follows a continuous or graded function.

Once the weights Wg, We, Wv, Wt and Wi are determined and function Fij is fit, the data can be used for comparing any pair of music. It is noteworthy that the weights can be changed dynamically if listener ratings for specific music sample change over time. Further, weights can be varied based upon individual listeners or a group of listeners. Weights can be specified for plural spaces. The modeled attribute data is stored and can be searched to compare music based upon pre-defined attributes.

FIG. 5C3 is a flow diagram showing various computerized process steps performed by Modeling Module 406 to process listener data and perform a similarity analysis.

In step S505A, listener response data is obtained from R&D database 405.

In step S505B, a similarity matrix (S1) is created. S1 is based upon data collected in step S501C (FIG. 5A). Matrix S1 includes perceived similarity data of a music pair, illustrated for convenience as pair i,j. Generally, matrix S1 includes ratings that illustrate similarity and/or dissimilarity between a pair of songs.

In step S505C, Modeling Module 406 creates a matrix S that includes plural feature vector values as shown above. Thereafter, Modeling Module 406 performs a dimensional reduction step so as to reduce the number of dimensions in matrix S. Assume that a feature vector v for a set of music samples =(V1,V2, V3 . . . Vn), where V1 . . . Vn are based upon plural responses received in steps S501A and S501B. A matrix S can be defined as: S=[V1|V2|V3| . . . VN], where S, is a n×p matrix, where p is the number of music samples in the set.

For computational ease, matrix S can be reduced to a smaller matrix S', where S' is a m×p matrix, where m<p. Hence S represents a set of p music samples in a n dimensional space and S' represents the same set in m dimensional space, where m<n. Various dimensional reduction techniques may be used, as described above.

In step S505D, Modeling Module 406 creates various subspaces, as described below. Music subspaces are based upon feature vector values. For example a feature vector V for a set of music samples is given by V=(V1,V2, V3 . . . Vn). Subsets of each vector V also include vectors that are defined in specific music spaces. For example vector V1 can include vectors Vg, Ve, Vt, Vv and Vi, where Vg represents a piece of music in a genre space, Ve represents a piece of music in a emotional quality space, Vt represents a piece of music in a tempo space, Vv represents a piece of music in a voice quality space and V1 represents a piece of music in a instrument space. Vg, Ve, Vt, Vv and Vi may be represented as follows:

$$Vg=(Vg1, \ldots Vga).$$

$$Ve=(Ve1, Ve2 \ldots Veb)$$

$$Vt=(Vt1, Vt2 \ldots Vtc)$$

$$Vv=(Vv1, Vv2 --- Vvd)$$

$$Vi=(Vi1, Vi2, \ldots Vie)$$

In step S505E, the process combines plural music spaces, i.e. genre space, vocal quality space, emotion space, sound quality space, instrument space and global space to fit the similarity matrix S1. A distance matrix D is calculated between the pair of songs in matrix S1. Distance between i and j piece of music may be calculated in more than one music space. One method of calculating distance is the Euclidean distance, illustrated as Dij, where $$Dij=SQRT\ (Vi1-Vj1)^2+(Vi2-Vj2)^2--- (Vik-Vjk)^2$$

where Vi1, Vi2 - - - V1k are feature vector values for the ith song, and specifies the location of a music sample in a particular space.

Distance matrix Dij is created for plural music spaces, and may be illustrated as Dg (Dg for genre space), De(for emotion space), Dv(for vocal space), Dt (for tempo space) and Di(for instrument space).

As discussed above, a music pair may be represented by the function Fij where $$Fij=WgDg+WeDe+WvDv+WtDt+WiDi,\ where\ Wg,\ We,\ Wv,$$

Wt and Wi are individual weights allocated to individual music spaces. The plural weights Wg, We, Wv, Wt and Wi are calculated such that S1 and Fi are at a minimum distance from each other. The discussion above describes how the plural weights may be calculated.

It is noteworthy that the combined music space can be created real time based upon listener request and preferences.

Production Database

In step S506, based upon the modeled data, production database 407 is created. The production database includes set of weights calculated in step S505. A sample entry in the production database 407 may be stored as follows:

| Data Block I. | | | | | | | | | | |
|---|---|---|---|---|---|---|---|---|---|---|
| song_id | v1 | v2 | v3 | v4 | v5 | v6 | v7 | v8 | v9 | v10 |
| | v11 | v12 | v13 | v14 | v15 | v16 | v17 | v18 | v19 | v20 | v21 |
| | v22 | v23 | v24 | v25 | v26 | v27 | v28 | v29 | v30 | v31 | v32 |
| | v33 | v34 | v35 | v36 | v37 | v38 | v39 | v40 | v41 | v42 | v43 |
| | v44 | v45 | v46 | v47 | v48 | v49 | v50 | v51 | v52 | v53 | v54 |
| | release_year | | | | | | | | | | |
| Data Block II. | | | | | | | | | | |
| 6319 | 0.663043 | 1.000000 | | NULL | 0.000000 | | 1.000000 | | 1.000000 | |
| | 1.000000 | 0.000000 | | 0.000000 | 0.000000 | | 0.000000 | | | |
| | 0.000000 | 0.000000 | | 0.000000 | 0.000000 | | 0.000000 | | | |
| | 0.000000 | 0.000000 | | 0.000000 | 0.000000 | | 0.000000 | | | |
| | 0.000000 | 0.000000 | | 0.000000 | 0.000000 | | 0.000000 | | | |
| | 1.000000 | 0.348485 | | 0.560606 | 0.424242 | | 0.409091 | | | |
| | 0.560606 | 0.530303 | | 0.636364 | 0.590909 | | 0.136364 | | | |
| | 0.166667 | 0.242424 | | 0.181818 | 0.196970 | | −0.080946 | | | |
| | 0.045888 | −0.132495 | | 0.029958 | 0.009163 | | 0.008496 | – | | |
| | 0.000661 | 0.655467 | | 1.317940 | 0.604017 | | 0.000000 | | | |
| | 0.000000 | 0.000000 | | 0.000000 | 1994 | | | | | |
| 6316 | 0.315217 | 1.000000 | | NULL | | 0.000000 | | 1.000000 | | |
| | 1.000000 | 1.000000 | | 0.000000 | 0.000000 | | 0.000000 | | | |
| | 1.000000 | 0.000000 | | 0.000000 | 0.000000 | | 0.000000 | | | |
| | 0.000000 | 0.000000 | | 0.000000 | 0.000000 | | 0.000000 | | | |
| | 0.000000 | 0.000000 | | 0.000000 | 0.000000 | | 0.000000 | | | |
| | 0.000000 | 1.000000 | | 0.370370 | 0.425926 | | 0.444444 | | | |
| | 0.296296 | 0.351852 | | 0.444444 | 0.518519 | | 0.481481 | | | |
| | 0.314815 | 0.259259 | | 0.333333 | 0.370370 | | 0.351852 | | | |
| | 0.175593 | 0.099421 | | 0.026434 | 0.028079 | | −0.041860 | – | | |
| | 0.033818 | 0.028811 | | 1.380721 | 0.924552 | | 0.149940 | | | |
| | 0.000000 | 0.000000 | | 0.000000 | 0.000000 | | 1990 | | | |

Block I specifies column names for feature vectors, while Block II includes the actual values corresponding to the Block I column entries. For illustration purposes, the first entry, song_id, is a unique identifier for each piece of music. Entries v1–v54 refer to specific attributes of each piece of music. The last entry, release_year, refers to the release year of the song. The following labels are used for v1–v54:

| NAME | Column Name |
|---|---|
| Tempo | v1 |
| Lead Vocals | v2 |
| Focus Background Vocals | v3 |
| Acoustic Guitar | v4 |
| Electric Guitar | v5 |
| Bass | v6 |
| Drums | v7 |
| Harmonica | v8 |
| Organ | v9 |
| Piano | v10 |
| Synthesizer | v11 |
| Horn | v12 |
| Saxophone | v13 |
| Strings | v14 |
| Alternative | v15 |
| Blues | v16 |
| Country | v17 |

-continued

| NAME | Column Name |
|---|---|
| Electronic/Dance | v18 |
| Folk | v19 |
| Gospel | v20 |
| Jazz | v21 |
| Latin | v22 |
| New Age | v23 |
| R&B/Soul | v24 |
| Rap/Hip-Hop | v25 |
| Reggae | v26 |
| Rock | v27 |
| Smooth Voice | v28 |
| Soulful Voice | v29 |
| Sexy Voice | v30 |
| Great Voice | v31 |
| Powerful Voice | v32 |
| Intense | v33 |
| Upbeat | v34 |
| Aggressive | v35 |
| Relaxing | v36 |
| Mellow | v37 |
| Sad | v38 |
| Romantic | v39 |
| Broken-hearted | v40 |
| Coord1 | v41 |
| Coord2 | v42 |
| Coord3 | v43 |
| Coord4 | v44 |
| Coord5 | v45 |
| Coord6 | v46 |
| Coord7 | v47 |
| Coord8 | v48 |
| Coord9 | v49 |
| Coord10 | v50 |
| Parent | v51 |
| Level | v52 |
| ClustVal | v53 |
| ClustNSong | v54 |
| Year | v55 |

The foregoing example is merely one way to store information in production database 407; other formats may be used to develop production database 407 within the spirit of the present invention. The foregoing example should be interpreted with respect to Appendix "A".

In step S 507, the process evaluates the similarity model created in step S505. Generally, a focus group of music listeners and experts will verify the similarity results by listening to music samples. Explicit feedback from users of the system is also used to modify the similarity model and to identify songs with poor similarity matches. All acceptable similarity matches are retained in production database 407.

In step S508, listeners and experts reevaluate all music samples that are rejected in step S507, and similarity data based upon listener response, similar to those in FIG. 7B, is obtained.

In step S509, music samples compared in step S508 are stored as matched sets in similarity database 407A. It is noteworthy that the invention is not limited to a separate similarity database. Music sets obtained after step S508 may be stored in the production database 407, without limiting the scope of the invention.

Music Space

As discussed above, one of the shortcomings of the conventional music search systems is that music cannot be searched by music content. The reason for this shortcoming is that music is an emotional experience that is difficult to describe by plain text. However, the present system solves this problem by providing plural music spaces that can locate music by content. As shown above, various aspects and perceptual qualities of music are described by a plurality of feature vector values. Most of the feature vectors are defined by data acquired in process steps shown in FIG. 5A.

Based upon feature vectors, a multidimensional music space is created. In the music space, a piece of music can be located based upon the co-ordinates that define specific music attributes. As discussed above, since music has plural facets and attributes, the plurality of feature vectors are divided into plural categories, for example, emotional quality vector, vocal quality vector, genre quality vector, ensemble vector and situational vector. Hence a plurality of music spaces may be used to define and locate music based upon music content defined by plural feature vectors. Examples of such music spaces are genre space, emotional quality space, vocal quality space, and tempo space etc., as discussed below.

A generic definition of music space for the purpose of this invention can be described as follows:

Let X be a set containing elements $\{x1, x2, \ldots\}$. Let a $f(xi,xj)$ be a real-valued function (where xi, xj are included in set X) which satisfies the following rules for any xi,xj, xk in X:

1. $f(xi,xj) >= 0$

2. $f(xi,xj) = 0$ if and only if $xi = xj$

3. $f(xi,xj) = f(xj,xi)$

4. $f(xi,xk) <= f(xi,xj) + f(xj,xk)$     [The Triangle Inequality]

Then the joint pair (X,f) is called a metric space and f is called the metric. In the present invention, a music space is a metric space defined by a given set of feature vectors).

Also, a combined music space is created based upon plural vectors such that a piece of music can be located within the combined music space with defined co-ordinates. The combined music space is created by providing certain weights to plural feature vectors. The weights for individual feature vectors may be calculated in a plurality of ways, as discussed above. Furthermore, the weights may be calculated based upon listener preferences. The combined music space is created based upon a listener's request and hence is dynamic in nature.

Creating a Genre Space

According to another aspect of the present invention, a genre space is created based upon data collected and modeled in FIG. 5A. The genre space is defined by a set of genre vectors, where the vector values are obtained from expert data collected in step S501A, according to questions 801 (FIG. 8A1). Based upon genre vector values, the location a music piece may be obtained in the genre space. The distance between different music samples within the genre space indicates the similarity between the music samples with respect to genre.

Creating a Voice Quality and Emotional Quality Space

According to another aspect of the present invention, a voice quality and emotional quality space is created based upon data collected and modeled in FIG. 5 and listener responses to questions in 700C and 700B (FIGS. 7A1 and 7A2), respectively.

The voice quality space determines the location of a piece of music in the vocal quality space. The voice quality space is defined by a set of feature vectors, where the feature vector values depend on listener response to questions in 700C (FIG. 7A2). Based upon voice quality vector values the location of a music piece may be obtained in the voice quality vector space. The distance between different music samples within the voice quality space indicates the similarity between the music samples with respect to voice quality.

The emotional quality space measures the emotional reaction to a particular piece of music. The emotional quality space is defined by a set of feature vectors (emotional quality vector), where the feature vector values are based upon listener responses to questions in 700B (FIGS. 7A1 and 7A2). Based upon emotional quality vector values, a music piece may be located in the emotional quality space. The distance between different music samples within the emotional quality space indicates the similarity between the music samples with respect to emotional reaction evoked by a piece of music.

Creating a Tempo Space

A "tempo" space is created by feature vector(s) whose value depends upon the number of beat per minute and/or second. The number of beats may be obtained by collecting expert data or by using an algorithm(s). Details of such algorithms to collect tempo data may be obtained from "Tempo and beat analysis of acoustic music signals", by Eric D. Scheirer, Machine Group listing, E-15-401D MIT media Laboratory, Cambridge, Mass. 02139)(December 1996), incorporated herein by reference.

Creating a Similarity Space

Details of creating a similarity space are provided above in Step S505 of FIG. 5A.

Combining Music Spaces

As described above, based upon the plural feature vectors, described above, every piece of sampled music is located in a genre space, voice quality space, emotional quality space, tempo space and a generic similarity space.

A combined music space is created real time based upon a listener's request for music. A piece of music has a location in the genre, vocal quality, emotional quality, and tempo space etc. Every space, including genre, voice quality, emotional quality, and tempo space is allocated a certain weight, wherein the value of the weight depends upon a user's preference and may be changed. A function defined by a weighted average of plural vectors provides a combined music space and assists in determining similar songs. The combined music space may be changed every time a listener provides a different request. An example of a combined music space that allows content based searching is given below:

Assume that a first music sample has the following locations:
- d1 in the genre space, d2 in the vocal quality space, d3 in the emotional quality space, d4 in the tempo space and d5 in the similarity space.

The location of first music sample is given by, D, where D is equal to:

$$W1*d1+W2*d2+W3*d3+W4*d4+W5*d5$$

W1, W2, W3, W4 and W5 are weights allocated to different spaces and may be changed. W1, W2, W3, W4 and W5 are calculated by a process similar to that of step S505. (FIGS. 5A and 5C3).

Assume that a second music sample has the following locations:
- d1' in the genre space, d2' in the vocal quality space, d3' in the emotional quality space, d4' in the tempo space and d5' in the similarity space.

The location of second music sample is given by D', where D' is equal to:

$$W1'*d1'+W2'*d2'+W3'*d3'+W4'*d4'+W5'*d5'.$$

W1', W2', W3', W4' and W5' are weights allocated to different spaces and may be changed. Weights W1', W2', W3', W4' and W5' are calculated by a process similar to that of step S505. (FIGS. 5A and FIG. 5C3).

Comparing D and D' compares the first and second music samples to each other. Details of comparing D and D' are provided above in step S505 of FIG. 5A.

FIG. 5D shows sample representation of individual spaces, for example, genre space, emotion space, vocal quality space and sound space. FIG. 5D also shows location of music samples A and B with respect to each other in specific spaces. It is noteworthy that FIG. 5D shows one way presenting individual spaces and is merely illustrative. FIG. 5D does not limit the scope of the invention to the specific examples.

Quality Assurance of the Rating Process

In another embodiment of the present invention, a quality assurance system is provided so that only music listeners that provide accurate and consistent ratings are used for acquiring data in steps S501A, S501B and S501C (FIG. 5A). The system uses plural techniques that evaluate music listener capabilities and consistency, including measuring "typicality", "reliability" and "discrimination".

Measuring Typicality

Figure 5E:
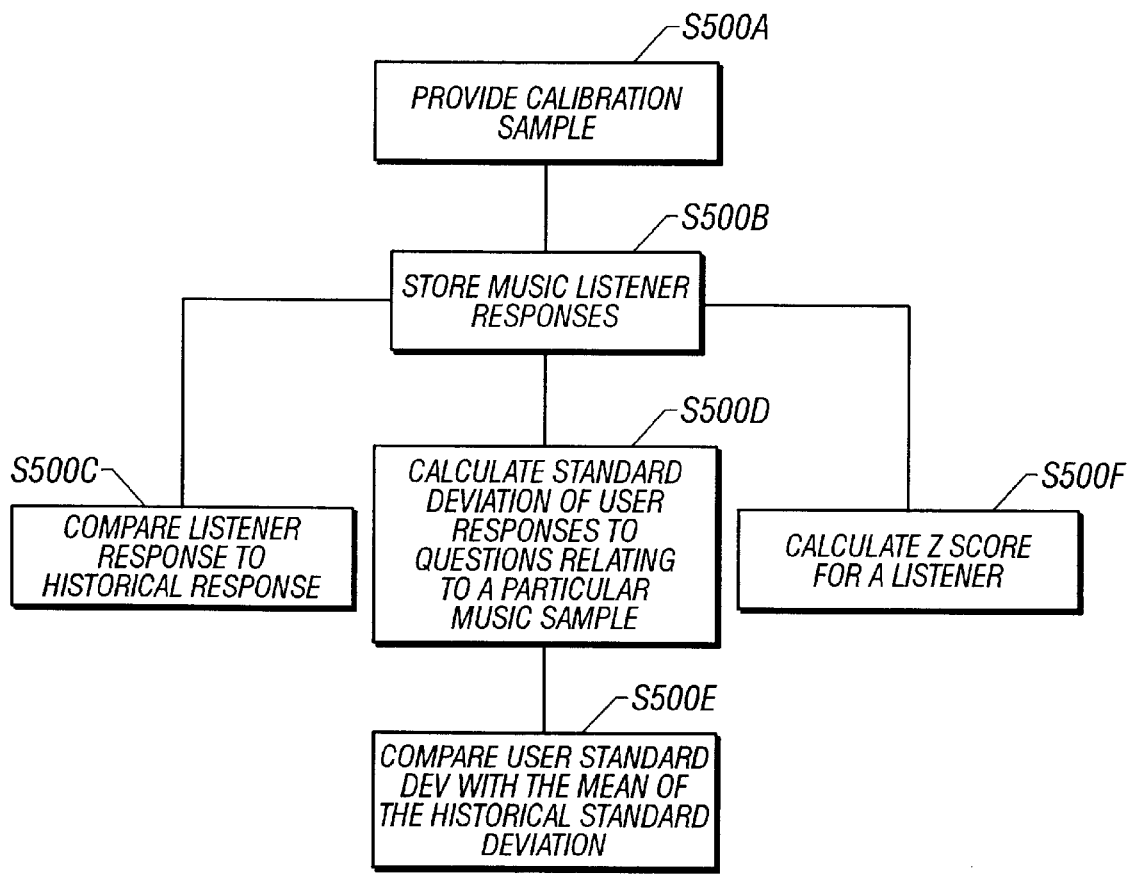
FIG. 5E is a flow diagram of computer executable process steps showing various operations performed to calibrate a music listener, according to the present invention.

The premise for measuring typicality is that if listeners provide accurate ratings, then they are more likely to agree with the responses of other music listeners. Prior to measuring typicality, a music listener is calibrated. FIG. 5E shows process steps for calibrating a music listener.

Calibration

In step S500A, a set of music samples with plural questions ("calibration sample") is provided to a music listener. Music samples with plural questions may be provided on-line via a computer connected to the Internet (Computer X, FIG. 3) or offline via CD's or audio tapes, etc. Generally, calibration music samples include music that has well known feature vector values or historical responses from other calibrated listeners.

In step S500B, a music listener's responses to the plural questions are collected and stored. FIG. 5F illustrates an example how collected data may be stored. Column 500AA in FIG. 5F, shows questions 1 to n that are asked for a specific music sample (Music Sample I), column 500BB shows music listener responses (R1 to Rn) to the questions in 500AA and historical responses (R1h to Rnh) or range of historical responses are shown in column 500CC.

Historical standard deviations ($\sigma 1h$ to $\sigma nh$) of music listeners responses are stored in column 500DD. For example, $\sigma 1$ is the standard deviation of the range of historical responses to question 1 for music sample I. FIG. 5F also shows a generic formula that may be used to calculate historical standard deviation values. Standard deviation values may be acquired from Acquired database 404 or R&D database 405.

FIG. 5F also shows Median values for historical responses stored in column 500EE. For example, median values for responses to question 1, Sample I, may be based upon M historical responses, stored as R1h1, R1h2, R1h3 - - - R1hn'. The median value R1hmed for question 1 can then be determined. The historical responses are collected according to steps S501A, S501B and S501C (FIG. 5A). The median values R1hmed to Rnhmed, as shown in column 500EE may be obtained from Acquired database 404 and/or R&D database 405 by determining the median value of M responses for each of the n questions.

Column 500FF shows the time spent by a listener in listening to a sample and answering a question(s) associated with the sample. Column 500GG shows the historical time spent by other listeners.

Column 500HH shows the mean values for the historical responses. For example for question 1, if the historical responses range from R1h1 to R1hn', then the mean for the response to question is (R1h1+R1h2 - - - R1hn')/n', and stored as R1hm.

It is noteworthy that FIG. 5F is illustrative and is not intended to limit the invention, as the data may be stored in a plurality of ways.

In step S500C, music listener's responses are compared to historical responses. For example, music listener sample response R1 for question 1, music sample I, is compared with response R1h1. If R1−R1h1 exceeds a value Rth, where Rth is a threshold value, then response R1 is tagged as a "bad" response. Rth is based upon historical responses and is continuously refined as more data is collected from music listeners and experts.

In step S500D, the process calculates standard deviation of music listener's responses. As shown in FIG. 5E, music listener standard deviation is calculated based upon responses R1 to Rn for a specific sample. FIG. 5F provides the formula for calculating the standard deviation.

In step S500E, the process compares music listener standard deviation to historical standard deviations. Historical standard deviation may be the mean of $\sigma 1h$ to $\sigma nh$. For example, if music listener standard deviation is Std(l) and the mean historical standard deviation for questions 1 to n is Std(h), then Std(l) is compared to Std(h) and if the difference is greater or less than a threshold value, then a music listener may need to be trained with respect to music samples, questions and responses. Feedback is provided automatically on-line while the music listener is still listening to a sample.

In step S500F, a music listener's Z score is calculated. Z score for a question i is given by: (Xi-Mean(i))/Std(i), where Xi is the-listener response to question i, Mean(i) is the historical mean for question i(column 500HH, FIG. 5F), STD(i) is the historical standard deviation of question i. For example with respect to FIG. 5E, Z score for the first question (hence i=1) is (R1−R1hm)/$\sigma 1$. Z score for each question is calculated and thereafter the process calculates $\Sigma z_i^2$. If $\Sigma z_i^2$ exceeds a defined threshold value, then a music listener's ratings are questioned and/or tagged. The threshold value is again based upon historical data and may be refined as more data is collected. Z score may also be calculated by using historical median values instead of the mean values shown above (500EE, FIG. 5E)

It is noteworthy that steps S500C, S500D and S500F may all be performed simultaneously or may be performed selectively. For example, only S500C or S500D or S500E or any other combination of the foregoing steps may be performed to adequately calibrate a listener.

Typicality

Figure 5G:
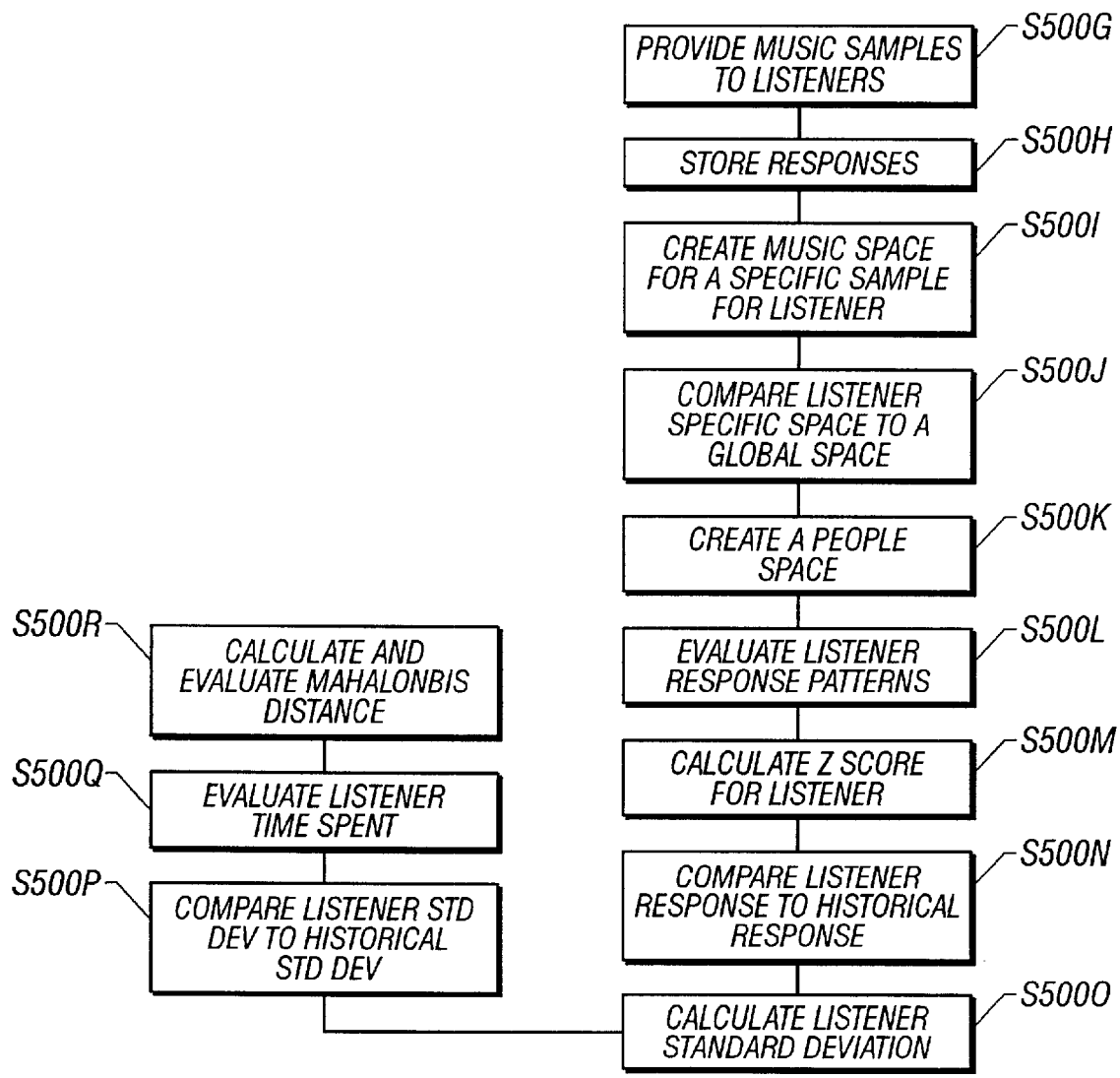
FIG. 5G is a flow diagram of computer executable process steps showing various operations performed to measure typicality of a music listener, according to the present invention.

FIG. 5G shows process steps to evaluate typicality of a music listener's response(s), after a music listener is calibrated per FIG. 5E.

In step S500G, a music listener is provided with more samples and questions regarding the music samples. Again the samples may be provided on-line via the Internet(or a private network), CDs or audio tapes, etc.

In step S500H, the process stores listener responses. Although listener responses are stored, some of the process steps shown below take place real time while a listener is listening to music and answering questions. FIG. 5F illustrates stored listener responses and historical values.

In step S500I, a music space based upon a music listener response to specific questions regarding a specific music sample is created. Listener specific music space is created as described above, in S500I (FIG. 5B). Listener responses as shown in FIG. 5F, column 500BB is used to create the music space.

In step S500J, music space for a listener is compared to the global space for a specific piece of music. Steps similar to those shown in S505 (FIG. 5A) may be used create a global space for a specific piece of music. Space comparison is also similar to that described above in FIG. 5A (step S505). If a listener's response pattern for a music sample is farther than a pre-determined threshold value, then the listener may have to be retrained before listener responses are used in steps S501A, S501B and S501C (FIG. 5A).

Figures 5H, 5I:
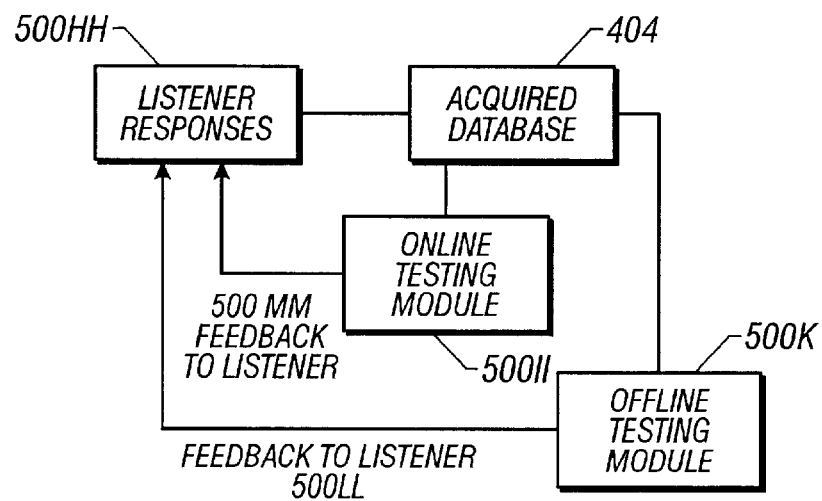
FIG. 5H shows another example of storing listener responses.
FIG. 5I is a block diagram showing a quality assurance system, according to the present invention.

In step S500K, a music listener space ("People Space") is created. The music listener space is based upon music listener responses to a set of music samples and a fixed set of questions. For example as shown in FIG. 5H, a music listener provides responses Rs1 and Rs1' to a first question for music samples I and II respectively. Rs1 and Rs1' are used to locate the listener in the People Space. A matrix (MP) may be formed with average listener responses to plural sets of music samples. Thus for a set of listeners matrix MP includes rows of questions and columns as listeners. The ijth entry of the MP matrix is the jth listener's average response to the ith question. Thus each listener is located in a space of questions, where the location reflects the general pattern of a listener's response to the questions In step S500L, listener patterns are evaluated. Plural listeners can be located based upon the pattern of responses to specific questions regarding similar music. Music listeners whose responses are not typical will generally be located farther from other listeners. A pre-determined threshold may be used to determine whether a music listener is typical or not typical.

In step S500M, the process calculates $\Sigma z_i^2$ for a plurality of questions similar to the process step S500F in FIG. 5E. Z score values if not equal to a threshold provides a measure of typicality for a music listener. Step S500L is conducted on-line while a listener is listening to music. Any feedback associated with deviant Z scores is provided to the listener real time and on-line via the Internet or a private network.

In step S500N, the process compares a music listener's response to historical responses, similar to step S500C in FIG. 5E. This step may be performed real time and on-line. If the listener's response exceeds a threshold then the response may be tagged as "bad" and the listener may be provided feedback.

In step S500O, calculate listener response standard deviation similar to step S500D in FIG. 5E.

In step S500P, compare listener standard deviation with historical standard deviation, similar to step S500E in FIG. 5E. Again, this step may be performed real time and on-line.

In step S500Q, the process evaluates the total time spent by a listener for a specific question. An example of the time spent is shown as column 500FF in FIG. 5F. This step may also be conducted real time and on-line while a listener is listening to music samples.

In step S500R, the process calculates a Mahalonobis Distance, as described below for a specific user. Mahalonobis distance is calculated for a specific feature vector. For each listener, the average response for specific questions for a similar set of music is recorded and the responses are stored as a "listener profile". The listener can hence be identified as a point in a multi-dimensional space created similar to the process step S500K.

Mahalonobis distance is the standardized distance from the center of listener location points to the actual location of a listener (standardized by the probability density of a multivariate Gaussian distribution) and is used as a measure of typicality. The Mahalonobis distance is the multivariate equivalent of the Z-score and is used similar to Z-scores (Step S500M), i.e., listeners with large Mahalonobis distances (exceeding a pre-determined threshold) are tagged as aberrant. The Mahalonobis distance is a multivariate way to standardize distances by a covariance matrix.

The threshold values for the foregoing quality assurance processes are initially determined based on initial data collected from music listeners and experts. However, the threshold values are dynamic and periodically refined as more data is collected.

Measuring Reliability

The premise for measuring reliability is that music listener's responses will be consistent if the responses to the same or similar music sample are consistent. Music listeners whose responses have been collected are provided with the same samples in random order. The responses are collected again and compared with the previous responses. If the variation in the responses exceeds a pre-determined threshold, then the music listeners are trained again.

Measuring Discrimination

Discrimination evaluation identifies listeners who do not use the entire range of available responses for a question. For example, if a listener has to choose from five different options for a specific question and the listener only chooses a few levels compared to historical responses, then the listener's responses will have low variance compared to the variance of the historical responses. Hence feedback is provided to the listener to make finer distinction between responses and samples.

Quality Assurance Block Diagram

FIG. 5I shows a block diagram that provides a quality assurance system for evaluating music listeners. Listener responses are received as 500HH same as in FIG. 5F, and sent to the Acquired database 404 (or R&D database 405). Some listener responses as shown above are evaluated On-line (Real time via the Internet or a private network) by On Line testing module 500II and based upon the On-line evaluation, feed back 500MM is sent to the listener. Off-line evaluation is performed on some aspects of listener responses by an Off Line testing module 500KK and feedback 500LL is provided to listeners, based upon the off line evaluation.

System Architecture

User Interface

Figure 10A:
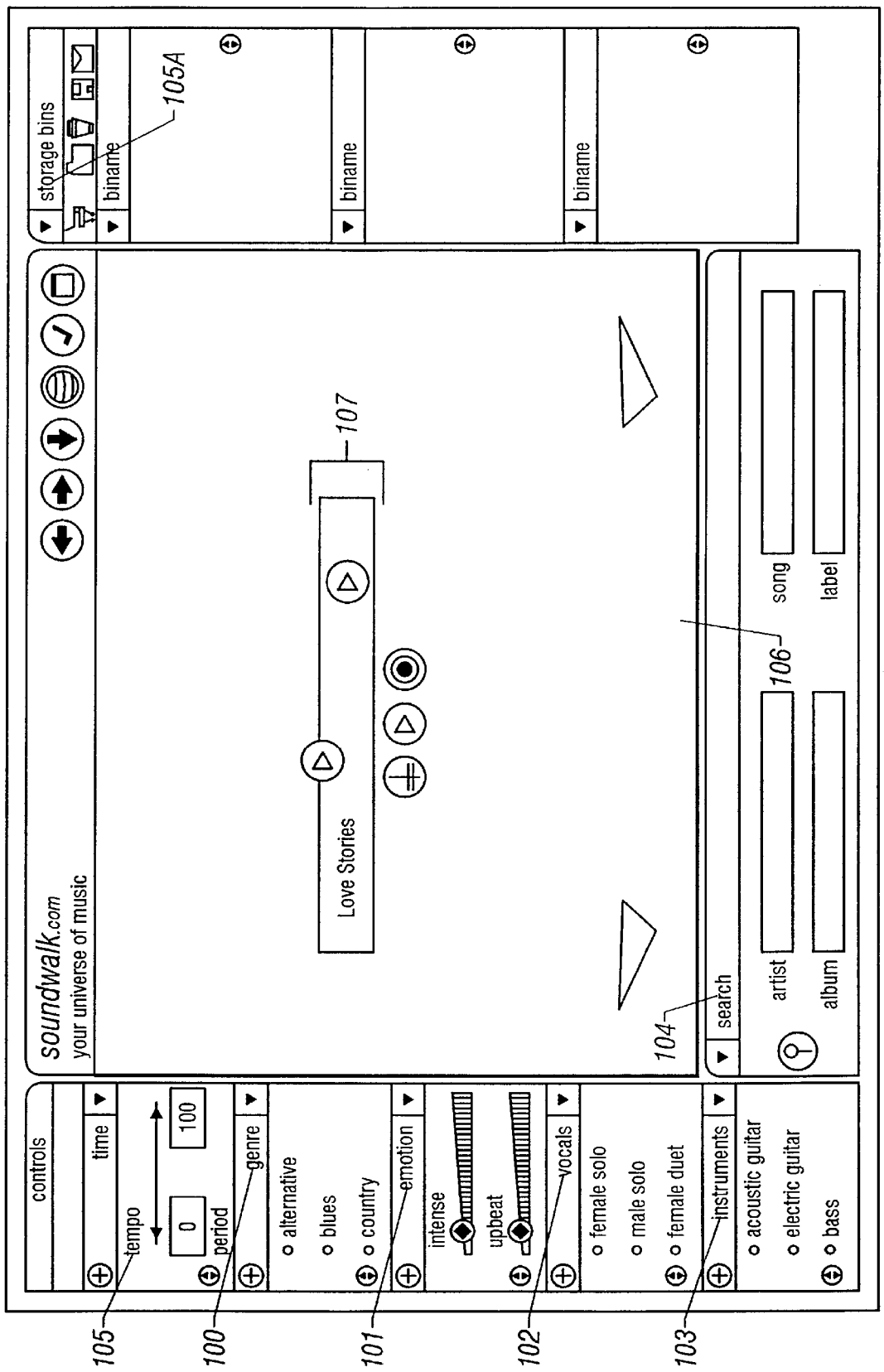
FIG. 10A shows a sample User Interface, according to the present invention.

FIG. 9 is a block diagram of the overall system architecture that allows content based music searching, according to another aspect of the present invention. FIG. 9 shows a User Interface (UI) 901 that receives a music searcher's ("user") request for music. A listener enters the request, based upon the listener's preferences. An example of UI 901 is shown in FIG. 10A. FIG. 10A shows a genre selector 100, an emotion selector 101, a vocal quality selector 102, a instruments selector 103 and a tempo selector 105.

Figure 10B:
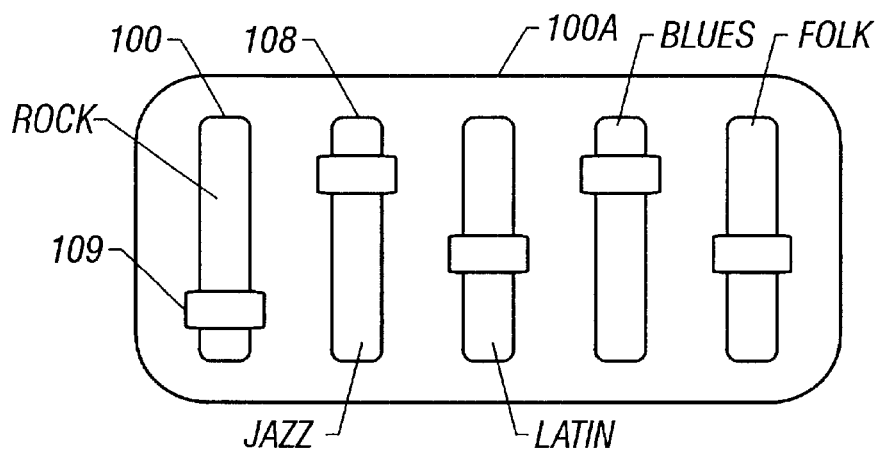
FIG. 10B shows a genre mixer, according to the present invention.

Genre selector 100 allows a listener to specify the level and number of descriptors that a listener desires to use. One such option is the use of a genre mixer 100A as shown in FIG. 10B.

The genre mixer 100A includes a plurality of variable sliding rulers 108 that allow a listener to set a certain level 109 for a specific genre. For example, as shown in FIG. 10B, a listener may request music with defined levels of Rock, Jazz, Latin, Blues, Folk, etc. It is noteworthy that the present invention is not limited to using a genre mixer 100A, and other methods (e.g., a pull down menu etc.) may be used to indicate listener preferences for music genres. Currently a listener may select a specific level for the following genres:

Alternative
Blues
Country
Electronic/Dance
Folk
Gospel
Jazz
Latin
New Age
R&B/Soul
Rap/Hip-Hop
Reggae
Rock The invention is not limited to any particular number of genres, hence future genres may be added to the genre selector 100A. Based upon listener selection, the current system uses genre as a filter to search for music as described below.

Figure 10C:
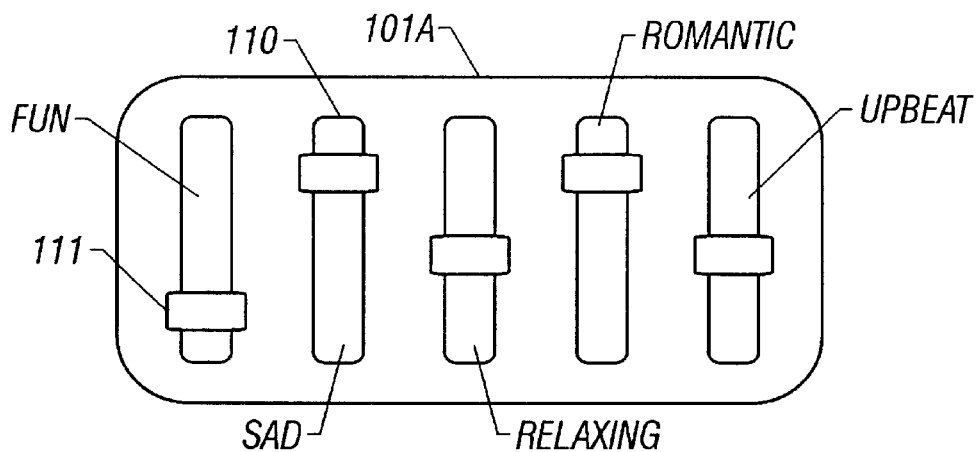
FIG. 10C shows an emotional quality mixer according to the present invention.

The emotion quality selector 101 enables a listener to specify the emotional quality for music. An emotional quality mixer 101A is shown in FIG. 10C that allows a listener to adjust emotion levels 111 for different emotions. For example, a listener may select a level of 40 for up beat emotion, 30 for relaxing, 25 for romantic, and zero for the rest. Listener selection for emotional quality determines another filter for the system to search for music, based upon music content.

Currently a listener may select a specific level of the following emotional qualities:

Intense
Upbeat
Aggressive
Relaxing
Mellow
Sad
Romantic
Broken-hearted

The invention is not limited to any particular number of emotional qualities, hence future emotion qualities may be added to the emotional quality selector 101A. Based upon listener selection, the current system uses emotional quality as a filter to search for music as described below.

Figure 10D:
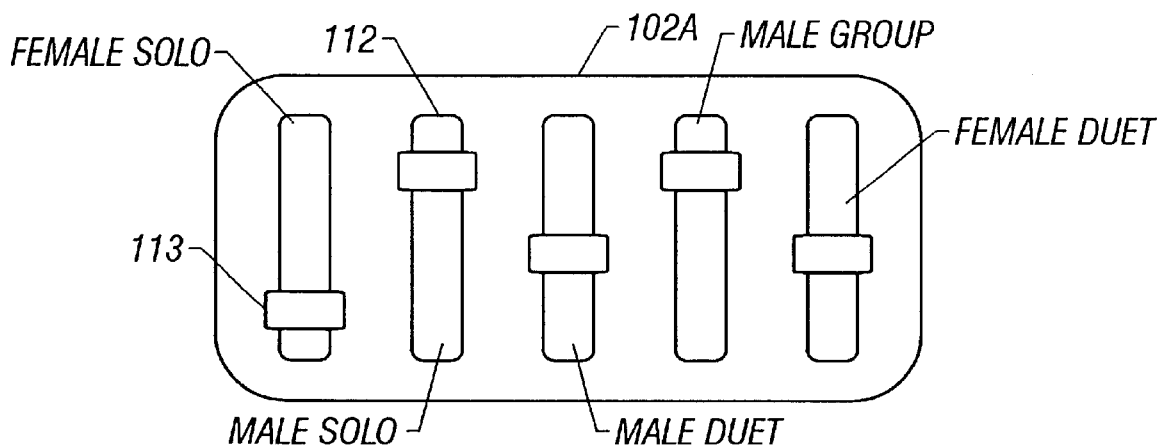
FIG. 10D shows a vocal quality mixer, according to the present invention.

A vocal quality selector 102 allows a listener to choose from a vocal ensemble, e.g., a female solo or a male solo. A vocal quality mixer 102A, as shown in FIG. 10D, also allows a listener to select from other possible ensembles, for example:

Female Solo

Male Solo

Female Duet

Male Duet

Mixed Duet

Female Group

Male Group

Mixed Group

Vocal quality selector 102 (selections not shown) can also allow a listener to choose from various vocal quality levels that may describe qualitative aspects of the vocal components of music, for example:

Smooth

Soulful

Sexy

Great

Powerful.

A vocal quality mixer similar to vocal quality mixer 102A may also be used to select various levels 113 of vocal quality by a sliding bar 112, for example a listener may select a level of 50 for "smooth", 25 for "sexy" and 25 for "great". It is noteworthy that the invention is not limited to any particular number of vocal qualities, hence future vocal qualities may be added to the vocal quality selector 102 and vocal quality mixer 102A.

An instrument selector 103 allows a listener to select a plurality of instruments, for example, Acoustic guitar Electric guitar Bass Drums Harmonica Organ Piano Synthesizer Horn Saxophone Strings An instrument mixer and tempo mixer similar to the voice quality mixer 102A, emotion quality mixer 101A and genre mixer 100A may be used to select and/or vary the influence of various instruments and/or music beat. The instrument selector 103 and tempo selector 105 provide other filters for UI engine 902 to search for music based upon music content.

A listener may also input standard search requests for an artist, title, label or album at the search selector 104. Standard search requests provide Standard Query language (SQL) calls for searching music.

UI 901, as shown in FIG. 10A also provides a graphical illustration of a music space 106. A listener may use the pointing device 14 or keyboard 13 (FIG. 1) to use the various options in display 107, e.g., to view search results, play certain music selections, stop playing music etc.

Appendix "A", II, also provides a list of filters that are used for content based searching according to the present invention in the music space 106.

UI Engine

As shown in FIG. 9, UI 901 is coupled to a UI engine 902. A user's request is submitted to UI engine 902 that searches for a song set based upon a specific listener request.

Figure 11:
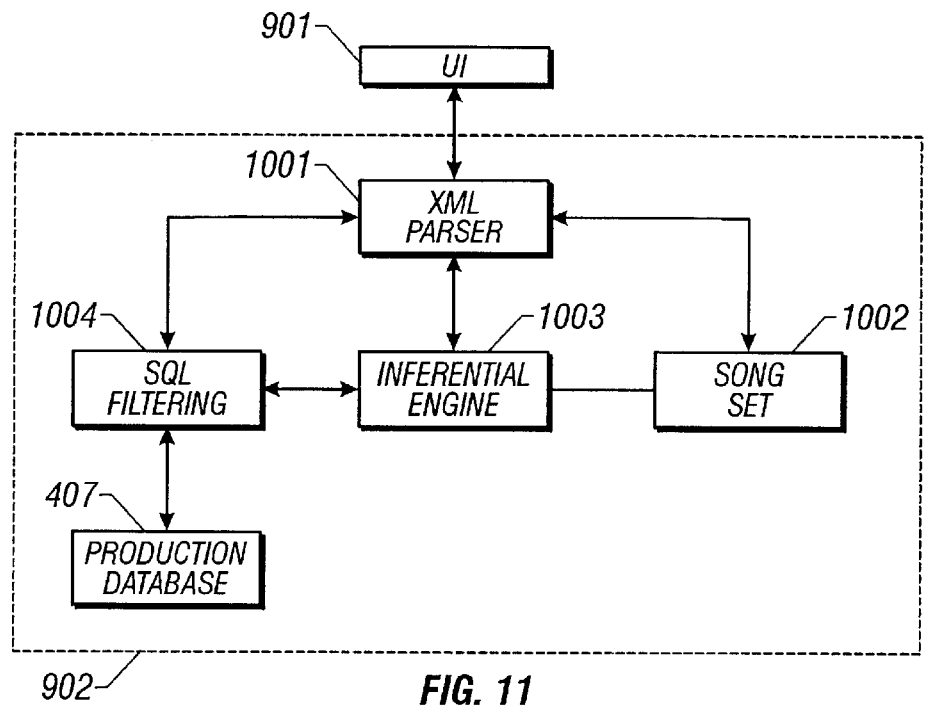
FIG. 11 is a block diagram of a User Interface engine, according to another embodiment of the present invention.

FIG. 11 shows a block diagram showing various components of UI engine 902. FIG. 11 shows a XML parser 1001 that receives listener requests from UI 901. It is noteworthy that the invention is not limited to using a XML parser 1001, and any other parser that can process UI 901's request may be used. XML parser 1001 extracts calls from a listener request and a two step searching step is performed based upon the listener request. In the first step, SQL calls are used to search production database 407 as shown below and with reference to Appendix "A":

Song Title

Album

Artist select uid, song_title, artist, album_title from song where song_title='SONG TITLE' select uid, song_title, artist, album_title from song where song_title='ALBUM' select uid, song_title, artist, album_title from song where song_title='ARTIST'

1) Timeline—Filter 13 select uid, song_title, artist, album_title from song where release_year>=filter 5. rangelo AND release_ year<=filter 5. rangehi

1) Instruments—Filters 21–31, refer to fields v4–v15 of song_vectors ***v4=v6

Select uid, song_title, artist,album_title from song, song_vectors where

1) Vocal Ensemble —Filter 15, refers to field v2 of song_vectors

Select uid, song_title, artist, album_title from song, song_vectors where [filterX conditions]

The SQL search provides a first set of songs. Using a second search refines this first set of songs. The inferential engine 1003 interacts with the production database 407 and performs a second search for songs in the genre space, emotional quality space and combined space if necessary. The refined search is based upon the similarity modeling as discussed above with respect to Modeling Module 406 (FIG. 5A, Step S505). Results of the refined search are presented as a music set 1002 to the user.

FIG. 9 shows UI engine 902 coupled to the production database 407, similarity database 407A and a user log database 903. User log database 903 is populated by tracking a user's music listening habits and the websites that a listener may visit while listening to a particular type of music. A listener profile is created that can be used for selective advertising and marketing purposes. Data collected in user log database 903 may also be used to selectively provide music to listeners based upon collected user profile data and music listening habits.

FIG. 9 also shows Research database 405 linked to similarity Modeling Module 406 that is linked to production database 407, similarity database 407A and user log database 903.

Process for Content Based Music Searching

Figure 12:
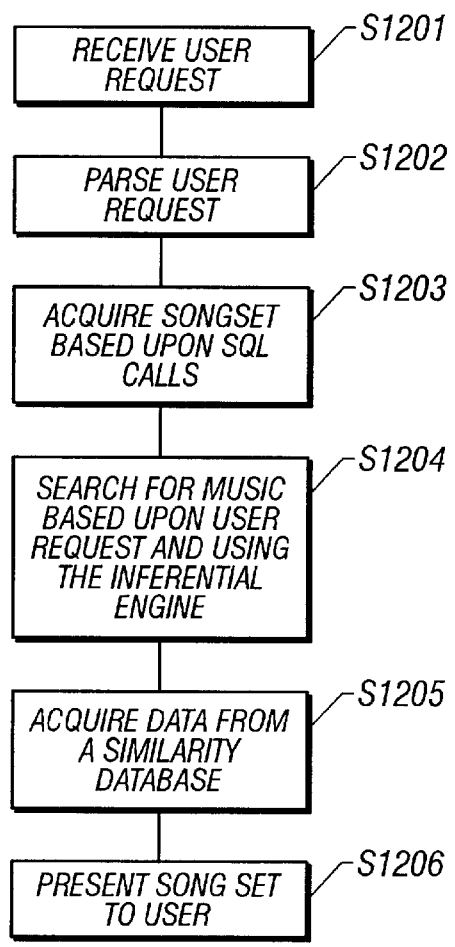
FIG. 12 is a flow diagram showing computer executable process steps for conducting content-based search in the music domain.

FIG. 12 shows computer executable process steps that allow a listener to search for music based upon music attributes and content. The concept of content based searching as illustrated below is included in a Music Query Language ("MQL") that allows content based searching.

In step S1201, a listener enters a request to search for music in UI 901. An example of a search request may be to search for music that is mellow, has a strong beat with 50% blues and 50% country blend, includes a male vocalist with a powerful voice, and the saxophone as the most important instrument. Hence, the request has the following parameters: "mellow", "Strong beat", "50% Blues and50% Country", "Male Vocalist", "Powerful Voice" and "Saxophone". It is noteworthy that the foregoing example is merely illustrative and the invention is not limited to the foregoing example.

In step S1202, UI engine 902 receives and parses the listener request. XML parser 1001 parses the listener request.

In step S1203, UI engines 902 acquire a first song set from production database 407. The first song set is acquired based upon SQL calls. Music can be searched for "Song Title", "Album Title", Name of the Artist, Tempo, or instruments, as shown above and in Appendix "A".

In step S1204, inferential engine 1003 searches for music using selection algorithms that allow searching in the emotional, genre, and/or combined music spaces. Inferential engine search is based upon data stored in production database 407 and similarity modeling principles used by Modeling Module 406 (FIG. 5A, Step S505). Based upon the search request above, one technique for searching that may be used is illustrated below:

(a) Location of 50% Blues and50% county in the Genre space (Ls);
(b) Determine all the songs that are within a certain distance from location Ls. A predetermined threshold may be used to find the songs within a certain weighted Euclidean distance; for example, choose all songs that are within "X" distance from Ls, where X is a predetermined threshold number.
(c) Provide the list of all songs within X distance from Ls to UI engine 902

In step S1205, acquire all music that is similar to the listener request from similarity database 407A. Generally, similarity database results will be acquired if step S1204 results are inaccurate.

In step S1206, the process presents a music set to the user. UI engine 902 provides the music set to UI 901. The music set includes the songs obtained by inferential engine 1003 and songs obtained from the similarity database 407A.

Figure 13:
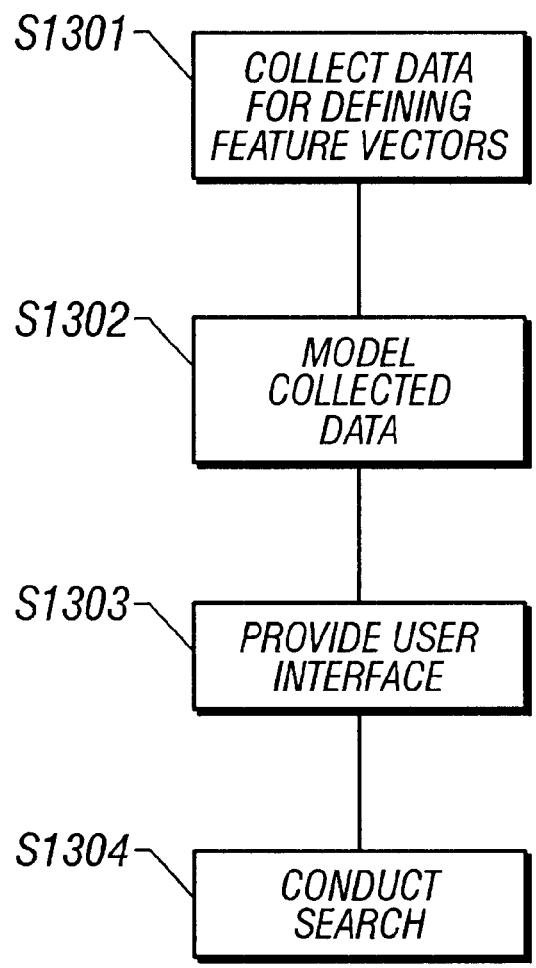
FIG. 13 is a flow diagram showing process steps for performing content-based search for aesthetic commodities.

FIG. 13 shows a flow chart of an overall system that allows content based searching for aesthetic commodities.

In step S1301, the process collects data that can define a plurality of attributes of a specific or a combination of aesthetic commodities. Data may be acquired as shown above in FIG. 5A. Based upon collected data, a plurality of feature vectors can be defined, as described above.

In step S1302, model the data acquired in step S1301. The modeling analysis is similar to that shown above and in FIG. 5C3. Modeling analysis also creates plural metric spaces similar to the music spaces shown above and in FIG. 5D.

In step S1303, the process provides a user interface to a user that may be similar to the user interface shown in FIG. 10A. The user interface will allow a user to define a search criterion based upon attributes of a specific aesthetic commodity.

In step S1304, the process performs a search for an aesthetic commodity similar to search performed in steps S1202–S1205 (FIG. 12).

One of the advantages of the present system is that feature vectors can describe music content. This assists in creating a music space for various attributes of music.

Another advantage of the present invention is that since the feature vectors define music attribute, music can be searched based upon music content.

Yet another advantage of the present invention is that any aesthetic commodity may be described by feature vectors and searched based upon content.

Although the present invention has been described with reference to specific embodiments, these embodiments are illustrative only and not limiting. Many other applications and embodiments of the present invention will be apparent in light of this disclosure and the following claims.

APPENDIX A

I.
```
table song_vectors (                          song_id double NOT NULL PRIMARY
KEY, v1 float,              # tempo (continuous)            v2 float,
            # lead vocal type (integer) (0-8)   v3 float,                     #
focus on background vocals? (bool) (0-1)
                #***** boolean instrument filters below
*****           v4 float,           # prominent acoustic guitar
(bool) (0-1)    v5 float,                   # prominent electric guitar
(bool) (0-1)    v6 float,                   # prominent bass (bool) (0-
1)
        v7 float,       # prominent drums (bool) (0-1)
        v8 float,       # prominent harmonica (bool) (0-1)
        v9 float,       # prominent organ (bool) (0-1)
        v10 float,          # prominent piano (bool) (0-1)
        V11 float,          # prominent synthesizer (bool)
(0-1)
        v12 float,          # prominent horn (bool) (0-1)
        v13 float,          # prominent saxophone (bool) (0-
1)
        v14 float,          # prominent strings (bool) (0-1)
                #***** continuous genre mixer filters
below *****
                #           these are subject to change
        v15 float,          # Alternative (continuous)
        v16 float,          # Blues (continuous)
        v17 float,          # Country (continuous)
        v18 float,          # Electronic/Dance (continuous)
        v19 float,          # Folk (continuous)
        v20 float,          # Gospel (continuous)
        v21 float,          # Jazz (continuous)
        v22 float,          # Latin (continuous)
```

APPENDIX A-continued

```
        v23 float,              # New Age (continuous)
        v24 float,              # R&B/Soul (continuous)
        v25 float,              # Rap/Hip-Hip (continuous)
        v26 float,              # Reggae (continuous)
        v27 float,              # Rock (continuous)
            #***** continuous Vocal Parameters
                    subject to change   v28 float,
    # Smooth Voice (continuous)
        v29 float,              # Soulful Voice (continuous)
        v30 float,              # Sexy Voice (continuous)
        v31 float,              # Great Voice (continuous)
        v32 float,              # Powerful Voice (continuous)
            #***** continuous Emotion Parameters
        v33 float,              # Intense
        v34 float,              # Upbeat
        v35 float,              # Aggressive
        v36 float,              # Relaxing
        v37 float,              # Mellow
        v38 float,              # Sad
        v39 float,              # Romantic
        v40 float,              # Broken-hearted
            #***** continuous coordinate parameters
        v41 float,              # coordinate 1
        v42 float,              # coordinate 2
        v43 float,              # coordinate 3
        v44 float,              # coordinate 4
        v45 float,              # coordinate 5
        v46 float,              # coordinate 6
        v47 float,              # coordinate 7
        v48 float,              # coordinate 8
        v49 float,              # coordinate 9
        v50 float           # coordinate 10
            #***** cluster related stuff
        v51 int,            # uid of parent song
        v52 int,            # level of song (if it's a std candle
song)
                            # will be -1 if it's a normal leaf
song
        v53 float,                  # continuous quantitative filter
measurement
        v54 int,            # number of songs in the cluster
                            represented by # this song
        v55 int             # release year
)
```

II. Filter Definitions
    Filter Structure:
```
<filter>
        <uid>5</uid>
        <value>.3<value>*
        <direction>3.14159</direction>*
        <rangelo>0</rangelo>*
        <rangehi>6.28318</rangehi>*
        <booleanlist>0 2 4 7 9</booleanlist>*
        <booleantype>0</boolean type>*
        <booleanstring>(1&&5)||(3&&8)&&!(6||3)</booleanstrin
g>* **
</filter>
```
* these fields are optional depending on the filter
** this generalized boolean query mechanism is subject to change List of Filters/controls with their corresponding fields:

FilterName
| index list | uid | value | direction | rangelo | rangehi | boolean |
|---|---|---|---|---|---|---|
| Genre Mixer Parameters: (uid's 0–99) | | | | | | |
| Alternative | 0 | 0–1 (continuous) | — | — | — | — |
| Blues | 1 | 0–1 (continuous) | — | — | — | — |
| Country | 2 | 0–1 (continuous) | — | — | — | — |
| Electronic/Dance | 3 | 0–1 (continuous) | — | — | — | — |
| Folk | 4 | 0–1 (continuous) | — | — | — | — |
| Gospel | 5 | 0–1 (continuous) | — | — | — | — |
| Jazz | 6 | 0–1 (continuous) | — | — | — | — |
| Latin | 7 | 0–1 (continuous) | — | — | — | — |
| New Age | 8 | 0–1 (continuous) | — | — | — | — |
| R&B/Soul | 9 | 0–1 (continuous) | — | — | — | — |
| Rap/Hip-Hop | 10 | 0–1 (continuous) | — | — | — | — |

APPENDIX A-continued

| | | | | | | |
|---|---|---|---|---|---|---|
| Reggae | 11 | 0–1 (continuous) | — | — | — | — |
| Rock | 12 | 0–1 (continuous) | — | — | — | — |

Vocal Quality (uid's 200–299)

| | | | | | | |
|---|---|---|---|---|---|---|
| Lead Vocals (int) | 200 | — | — | — | — | 0–8 |

\*\*note: For Lead Vocals) the meaning of the values are the following:
        0 = female solo, 1 = male solo, 2 = female duet, 3 = male duet, 4 = mixed duet, 5 = female group, 6 = male group, 7 = mixed group, 8 = instrumental.
        The <boolean type> parameter should be frozen at 1 for 'or.'
    Thus a typical XML filter structure for this parameter may be:
        <filter>
            <uid>15</uid>
            <booleanlist>0 2 4</booleanlist>
            <booleantype>1</booleantype>
        </filter>
    which means, provide songs that are either 'female solo vocals,' 'female duet vocals,' or 'mixed duet vocals.'
    \*\*\*note: an additional field is included in the XML filter structure, <booleanstring> to provide more powerful, arbitrary combinations of boolean values and operators.

Vocal MixerParameters (uid's 300–399)

| | | | | | | |
|---|---|---|---|---|---|---|
| Smooth Voice | 300 | 0–1 (continuous) | — | — | — | — |
| Soulful Voice | 301 | 0–1 (continuous) | — | — | — | — |
| Sexy Voice | 302 | 0–1 (continuous) | — | — | — | — |
| Great Voice | 303 | 0–1 (continuous) | — | — | — | — |
| Powerful Voice | 304 | 0–1 (continuous) | — | — | — | — |
| Vocal Circumplex int | 305 | 0–1 (continuous) | 0–2PI (continuous) | — | — | 0–10 |

\*the circumplex arranges the previous 5 parameters on a circle.

Instrument Parameters (uid's 400–499)

| | | | | | | |
|---|---|---|---|---|---|---|
| Acoustic Guitar | 400 | 0–1 (boolean) | — | — | — | — |
| Electric Guitar | 401 | 0–1 (boolean) | — | — | — | — |
| Bass | 402 | 0–1 (boolean) | — | — | — | — |
| Drums | 403 | 0–1 (boolean) | — | — | — | — |
| Harmonica | 404 | 0–1 (boolean) | — | — | — | — |
| Organ | 405 | 0–1 (boolean) | — | — | — | — |
| Piano | 406 | 0–1 (boolean) | — | — | — | — |
| Synthesizer | 407 | 0–1 (boolean) | — | — | — | — |
| Horn | 408 | 0–1 (boolean) | — | — | — | — |
| Saxophone | 409 | 0–1 (boolean) | — | — | — | — |
| Strings | 410 | 0–1 (boolean) | — | — | — | — |

Emotion Mixer Parameters (uid's 500–599)

| | | | | | | |
|---|---|---|---|---|---|---|
| Intense | 500 | 0–1 (continuous) | — | — | — | — |
| Upbeat | 501 | 0–1 (continuous) | — | — | — | — |
| Aggressive | 502 | 0–1 (continuous) | — | — | — | — |
| Relaxing | 503 | 0–1 (continuous) | — | — | — | — |
| Mellow | 504 | 0–1 (continuous) | — | — | — | — |
| Sad | 505 | 0–1 (continuous) | — | — | — | — |
| Romantic | 506 | 0–1 (continuous) | — | — | — | — |
| Broken-hearted | 507 | 0–1 (continuous) | — | — | — | — |

III. Relevant Tables in the Production Database

```
table songs (
        uid double NOT NULL PRIMARY KEY,
        created datetime,
        song_title varchar(255),
        artist varchar(255),
        genre double,
        album_title varchar(255),
        release_year int,              * this is used for the timeline filter
        parent double # parent song, null if we're the highest in this
genre
)
create table filters (
        uid int NOT NULL PRIMARY KEY,
        name varchar(255),
        column_name varchar(18) NOT NULL,      * maps to columns in
song_vectors
        type int * TBD, probably used for whether this is an SQL or
other param
                        # for now, 0=SQL only, 1=attrvector param for
Matlab
)\g
```

What is claimed is:

1. A method for creating a database that allows content based searching in the music domain, comprising:

providing music samples to music listeners, wherein the music listeners include a plurality of average music listeners and a plurality of expert music listeners;

providing a plurality of questions to the average music listeners and the expert music listeners; wherein the plurality of questions require a listener response and every listener response assigns a value to a feature vector, wherein the feature vector defines a music attribute; and comparing the plurality of music samples, wherein the music sample is compared by comparing the feature vectors.

2. The method of claim 1, further comprising:

storing the compared music samples in a production database.

3. The method of claim 1, wherein the plurality of average music listeners are asked a plurality of questions and the music listeners response to the questions defines an emotional quality vector, wherein the emotional quality vector is based upon the music listener's response indicating that the music sample is Intense, Happy, Sad, Mellow, Romantic, Heartbreaking, Aggressive, or Upbeat.

4. The method of claim 1, wherein the plurality of average music listeners are asked a plurality of questions and the response to the questions defines a vocal vector, wherein the vocal vector is based upon the music listener's response indicating that the music sample includes a Sexy voice, a Smooth voice, a Powerful voice, a Great voice, or a Soulful voice.

5. The method of claim 1, wherein the plurality of average music listeners are asked a plurality of questions and the response to the questions defines a sound quality vector, wherein the sound quality vector is based upon the music listener's response indicating if the music has a, Strong beat, or is Simple, or has a good groove, or is Fast, or is speech like, or emphasizes a melody.

6. The method of claim 1, wherein the plurality of average music listeners are asked a plurality of questions and the response defines a situational quality vector, wherein the situational quality vector is based on the music listener's response indicating if the music sample is, good for a workout, a shopping mall, a dinner party, a dance party, for slow dancing, or for studying.

7. The method of claim 1, wherein the plurality of expert music listeners are asked a plurality of questions and the response to the questions defines a genre vector, wherein genre vector depends the expert listener's response to the questions indicating if the music sample belongs to a plurality of genres including, Alternative, Blues, Country, Electronic/Dance, Folk, Gospel, Jazz, Latin, New Age, R&B, Soul, Rap, Hip-Hop, Reggae, Rock or others.

8. The method of claim 1, wherein the plurality of expert music listeners are asked a plurality questions and the response to the questions defines an ensemble vector, wherein the ensemble vector depends upon the experts listener's response indicating whether the music sample is a female solo, male solo, female duet, male duet, mixed duet, female group, male group or instrumental.

9. The method of claim 1, wherein the plurality of expert music listeners are asked a plurality of questions and the response to the questions defines an instrument vector, wherein the instrument vector depends upon the experts listener's response indicating whether the music sample is includes an acoustic guitar, electric guitar, bass, drums, harmonica, organ, piano, synthesizer, horn, or saxophone.

10. The method of claim 1, wherein the music samples to the music listeners and expert listeners are provided over the Internet.

11. A computer-readable medium storing computer-executable process steps of a process for use in a computer system for creating a database that allows content based music searching, comprising of:

providing music samples to music listeners, wherein the music listeners includes a plurality of average music listeners and a plurality of expert music listeners;

providing a plurality of questions to the average music listeners and the expert music listeners; wherein the plurality of questions require a listener response and every listener response assigns a value to a feature vector, wherein the feature vector defines a music attribute; and comparing the plurality of music samples, wherein the music sample is compared by comparing the feature vectors.

12. The computer readable medium of claim 11, further comprising:

storing the compared music samples in a database.

13. The computer readable medium of claim 11, wherein the plurality of average music listeners are asked a plurality of questions and the music listeners response to the questions defines an emotional quality vector, wherein the emotional quality vector is based upon the music listener's response indicating the music sample is Intense, Happy, Sad, Mellow, Romantic, Heartbreaking, Aggressive, or Upbeat.

14. The computer readable medium of claim 11, wherein the plurality of average music listeners are asked a plurality of questions and the response to the questions defines a vocal vector, wherein the vocal vector is based upon the music listener's response indicating that the music sample includes a Sexy voice, a Smooth voice, a Powerful voice, a Great voice, or a Soulful voice.

15. The computer readable medium of claim 11, wherein the plurality of average music listeners are asked a plurality of questions and the response to the questions defines a sound quality vector, wherein the sound quality vector is based upon the music listener's response indicating if the music has a, Strong beat, or is Simple, or has a good groove, or is Fast, or is speech like, or emphasizes a melody.

16. The computer readable medium of claim 11, wherein the plurality of average music listeners are asked a plurality of questions and the response defines a situational quality vector, wherein the situational quality vector is based on the music listener's response indicating if the music sample is, good for a workout, a shopping mall, a dinner party, a dance party, for slow dancing, or for studying.

17. The computer readable medium of claim 11, wherein the plurality of expert music listeners are asked a plurality of questions and the response to the questions defines a genre vector, wherein genre vector depends the expert listener's response to the questions indicating if the music sample belongs to a plurality of genres including, Alternative, Blues, Country, Electronic/Dance, Folk, Gospel, Jazz, Latin, New Age, R&B, Soul, Rap, Hip-Hop, Reggae, Rock or others.

18. The computer readable medium of claim 11, wherein the plurality of expert music listeners are asked a plurality questions and the response to the questions defines an ensemble vector, wherein the ensemble vector depends upon the experts listener's response indicating whether the music sample is a female solo, male solo, female duet, male duet, mixed duet, female group, male group or instrumental.

19. The computer readable medium of claim 11, wherein the plurality of expert music listeners are asked a plurality of questions and the response to the questions defines an instrument vector, wherein the instrument vector depends upon the experts listener's response indicating whether the music sample is includes an acoustic guitar, electric guitar, bass, drums, harmonica, organ, piano, synthesizer, horn, or saxophone.

20. The computer readable medium of claim 11, wherein the music samples to the music listeners and expert listeners are provided over the Internet.

* * * * *